United States Patent
Fotteler et al.

(10) Patent No.: US 8,108,270 B2
(45) Date of Patent: Jan. 31, 2012

(54) METHOD AND SYSTEM FOR PRODUCT LAYOUT DISPLAY USING ASSORTMENT GROUPS

(75) Inventors: Christine Fotteler, Winnetka, IL (US); Hergen Busch, Chicago, IL (US)

(73) Assignee: SAP AG, Walldorf (DE)

( * ) Notice: Subject to any disclaimer, the term of this patent is extended or adjusted under 35 U.S.C. 154(b) by 1405 days.

(21) Appl. No.: 11/028,485

(22) Filed: Jan. 3, 2005

(65) Prior Publication Data

US 2005/0197928 A1    Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 10/00* (2006.01)
*G06Q 99/00* (2006.01)
*G06F 17/50* (2006.01)
*G06F 9/44* (2006.01)

(52) U.S. Cl. .................................. 705/28; 705/1; 705/7

(58) Field of Classification Search .................... 705/28, 705/1, 7
See application file for complete search history.

(56) References Cited

U.S. PATENT DOCUMENTS

| | | | |
|---|---|---|---|
| 4,752,877 A | 6/1988 | Roberts et al. | |
| 5,015,190 A * | 5/1991 | Fowlkes, Jr. | ................... 434/72 |
| 5,315,508 A | 5/1994 | Bain et al. | |
| 5,400,253 A | 3/1995 | O'Connor | |
| 5,450,317 A | 9/1995 | Lu et al. | |
| 5,615,109 A | 3/1997 | Eder | |
| 5,758,327 A | 5/1998 | Gardner et al. | |
| 5,832,456 A | 11/1998 | Fox et al. | |
| 5,870,716 A | 2/1999 | Sugiyama et al. | |
| 5,930,771 A | 7/1999 | Stapp | |

(Continued)

FOREIGN PATENT DOCUMENTS

JP    2004-030343 A    1/2004

(Continued)

OTHER PUBLICATIONS

SAP announces advanced forcasting and replenishment, Business Editors Retail system 2002 Conference: Business wire New Yotk Jun. 25, 2002 p. 1.*

(Continued)

*Primary Examiner* — Matthew S Gart
*Assistant Examiner* — Harshad Parikh
(74) *Attorney, Agent, or Firm* — Foley & Lardner LLP

(57) ABSTRACT

A system, method and program product are provided for determining a product layout for a group of stores. An assortment is defined as a group of stores. An assortment version is defined by assigning a first product to the assortment for a time period, thereby determining the time period during which the first product is in the assortment. A layout module is defined and the layout module is assigned to the assortment, the layout module representing a display area of the store. A layout module version is defined that represents a product layout for the group of stores for a time period based on the corresponding assortment version. The layout module information is provided to a shelf optimization or ranging program. The optimized layout module information is received and the optimized layout module information is inputted to the layout module version.

18 Claims, 17 Drawing Sheets

U.S. PATENT DOCUMENTS

| | | |
|---|---|---|
| 5,953,707 A | 9/1999 | Huang et al. |
| 5,999,914 A | 12/1999 | Blinn et al. |
| 6,006,196 A | 12/1999 | Feigin et al. |
| 6,009,407 A | 12/1999 | Garg |
| 6,029,139 A | 2/2000 | Cunningham et al. |
| 6,064,984 A | 5/2000 | Ferguson et al. |
| 6,078,891 A | 6/2000 | Riordan et al. |
| 6,151,582 A | 11/2000 | Huang et al. |
| 6,167,380 A | 12/2000 | Kennedy et al. |
| 6,260,024 B1 | 7/2001 | Shkedy |
| 6,341,351 B1 | 1/2002 | Muralidhran et al. |
| 6,366,890 B1* | 4/2002 | Usrey ................... 705/7.31 |
| 6,493,678 B1 | 12/2002 | Foster et al. |
| 6,505,093 B1 | 1/2003 | Thatcher et al. |
| 6,507,851 B1 | 1/2003 | Fujiwara et al. |
| 6,510,420 B1 | 1/2003 | Cessna et al. |
| 6,578,009 B1* | 6/2003 | Shinozaki ................ 705/36 R |
| 6,584,447 B1 | 6/2003 | Fox et al. |
| 6,597,379 B1 | 7/2003 | Morris et al. |
| 6,701,299 B2 | 3/2004 | Kraisser et al. |
| 6,711,550 B1* | 3/2004 | Lewis et al. ............... 705/7.31 |
| 6,725,204 B1 | 4/2004 | Gusley |
| 6,868,528 B2 | 3/2005 | Roberts |
| 6,910,017 B1 | 6/2005 | Woo et al. |
| 6,954,736 B2 | 10/2005 | Menninger et al. |
| 6,980,966 B1 | 12/2005 | Sobrado et al. |
| 7,006,981 B2* | 2/2006 | Rose et al. ............... 705/7.31 |
| 7,069,232 B1 | 6/2006 | Fox et al. |
| 7,080,026 B2 | 7/2006 | Singh et al. |
| 7,080,030 B2 | 7/2006 | Eglen et al. |
| 7,082,408 B1 | 7/2006 | Baumann et al. |
| 7,092,896 B2 | 8/2006 | Delurgio et al. |
| 7,092,929 B1* | 8/2006 | Dvorak et al. ............... 705/28 |
| 7,103,560 B1 | 9/2006 | Fox et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,130,811 B1 | 10/2006 | Delurgio et al. |
| 7,137,566 B2 | 11/2006 | Silverbrook et al. |
| 7,139,731 B1 | 11/2006 | Alvin |
| 7,155,402 B1 | 12/2006 | Dvorak |
| 7,171,376 B2 | 1/2007 | Ramakrishnan |
| 7,197,474 B1 | 3/2007 | Kitts |
| 7,213,037 B2 | 5/2007 | Rangadass |
| 7,257,544 B2 | 8/2007 | Rose et al. |
| 7,310,646 B2 | 12/2007 | Rangadass et al. |
| 7,353,195 B2 | 4/2008 | Inoue et al. |
| 7,370,364 B2 | 5/2008 | Dobbins et al. |
| 7,386,492 B2* | 6/2008 | Ginsburg et al. ............... 705/28 |
| 7,386,519 B1 | 6/2008 | Delurgio et al. |
| 7,467,098 B2 | 12/2008 | Razumov |
| 7,523,048 B1 | 4/2009 | Dvorak |
| 7,552,066 B1 | 6/2009 | Landvater |
| 7,689,460 B2* | 3/2010 | Natori et al. ............... 705/22 |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0047293 A1* | 11/2001 | Waller et al. ............... 705/10 |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026296 A1* | 2/2002 | Lohmann et al. ................ 703/1 |
| 2002/0026368 A1 | 2/2002 | Carter, III |
| 2002/0035537 A1* | 3/2002 | Waller et al. ............... 705/37 |
| 2002/0042755 A1 | 4/2002 | Kumar et al. |
| 2002/0059108 A1 | 5/2002 | Okura et al. |
| 2002/0059122 A1 | 5/2002 | Inoue et al. |
| 2002/0066033 A1 | 5/2002 | Dobbins et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0087532 A1 | 7/2002 | Barritz et al. |
| 2002/0099597 A1 | 7/2002 | Gamage et al. |
| 2002/0099678 A1 | 7/2002 | Albright et al. |
| 2002/0107713 A1 | 8/2002 | Hawkins |
| 2002/0116241 A1 | 8/2002 | Sandhu et al. |
| 2002/0120459 A1 | 8/2002 | Dick et al. |
| 2002/0120533 A1* | 8/2002 | Wiesenmaier ................ 705/27 |
| 2002/0123930 A1 | 9/2002 | Boyd et al. |
| 2002/0124109 A1 | 9/2002 | Brown |
| 2002/0133385 A1 | 9/2002 | Fox et al. |
| 2002/0138290 A1 | 9/2002 | Metcalfe et al. |
| 2002/0147630 A1 | 10/2002 | Rose et al. |
| 2002/0147668 A1 | 10/2002 | Smith et al. |
| 2002/0152128 A1 | 10/2002 | Walch et al. |
| 2002/0165834 A1 | 11/2002 | Delurgio et al. |
| 2002/0184116 A1 | 12/2002 | Tam et al. |
| 2003/0018513 A1 | 1/2003 | Hoffman et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0050869 A1* | 3/2003 | Bruynsteen ................ 705/28 |
| 2003/0061081 A1 | 3/2003 | Kellond et al. |
| 2003/0074269 A1 | 4/2003 | Viswanath |
| 2003/0083925 A1 | 5/2003 | Weaver et al. |
| 2003/0110052 A1* | 6/2003 | Capazario et al. .............. 705/1 |
| 2003/0126024 A1 | 7/2003 | Crampton et al. |
| 2003/0130883 A1 | 7/2003 | Schroeder et al. |
| 2003/0130905 A1 | 7/2003 | Foster et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0154141 A1 | 8/2003 | Capazario et al. |
| 2003/0158791 A1 | 8/2003 | Gilberto et al. |
| 2003/0171978 A1 | 9/2003 | Jenkins et al. |
| 2003/0171979 A1* | 9/2003 | Jenkins ................... 705/10 |
| 2003/0171998 A1 | 9/2003 | Pujar et al. |
| 2003/0172007 A1 | 9/2003 | Helmolt et al. |
| 2003/0187665 A1 | 10/2003 | Boyd |
| 2003/0195791 A1* | 10/2003 | Waller et al. ................ 705/10 |
| 2003/0195810 A1 | 10/2003 | Raghupathy et al. |
| 2003/0200129 A1* | 10/2003 | Klaubauf et al. .............. 705/8 |
| 2003/0200148 A1* | 10/2003 | Razumov ................ 705/26 |
| 2003/0200150 A1 | 10/2003 | Westcott et al. |
| 2003/0208365 A1 | 11/2003 | Avery et al. |
| 2003/0216969 A1* | 11/2003 | Bauer et al. ................ 705/22 |
| 2003/0229502 A1 | 12/2003 | Woo |
| 2004/0002912 A1 | 1/2004 | Colon et al. |
| 2004/0010463 A1 | 1/2004 | Hahn-Carlson et al. |
| 2004/0098358 A1 | 5/2004 | Roediger |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0177075 A1 | 9/2004 | Rangadass |
| 2004/0186765 A1 | 9/2004 | Kataoka |
| 2004/0186783 A1 | 9/2004 | Knight et al. |
| 2004/0210489 A1* | 10/2004 | Jackson et al. ................ 705/22 |
| 2004/0215662 A1 | 10/2004 | Rangadass |
| 2004/0220861 A1 | 11/2004 | Morciniec et al. |
| 2004/0254950 A1 | 12/2004 | Musgrove et al. |
| 2004/0267674 A1 | 12/2004 | Feng et al. |
| 2004/0267676 A1 | 12/2004 | Feng et al. |
| 2005/0004831 A1 | 1/2005 | Najmi et al. |
| 2005/0015303 A1 | 1/2005 | Dubin et al. |
| 2005/0021541 A1 | 1/2005 | Rangadass et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096963 A1* | 5/2005 | Myr et al. ................ 705/10 |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0165659 A1 | 7/2005 | Gruber |
| 2005/0171825 A1 | 8/2005 | Denton et al. |
| 2005/0189414 A1 | 9/2005 | Fano et al. |
| 2005/0197849 A1 | 9/2005 | Fotteler et al. |
| 2005/0197850 A1 | 9/2005 | Fotteler et al. |
| 2005/0197872 A1 | 9/2005 | Fotteler et al. |
| 2005/0197878 A1 | 9/2005 | Fotteler et al. |
| 2005/0197881 A1 | 9/2005 | Fotteler et al. |

| | | | |
|---|---|---|---|
| 2005/0197882 A1 | | 9/2005 | Fotteler et al. |
| 2005/0197887 A1* | | 9/2005 | Zuerl et al. ............... 705/10 |
| 2005/0197928 A1 | | 9/2005 | Fotteler et al. |
| 2005/0205670 A1* | | 9/2005 | Natori et al. ............ 235/383 |
| 2005/0209900 A1* | | 9/2005 | Kettner et al. .............. 705/8 |
| 2005/0216371 A1 | | 9/2005 | Fotteler et al. |
| 2005/0234762 A1* | | 10/2005 | Pinto et al. ............... 705/10 |
| 2005/0235020 A1* | | 10/2005 | Gabelmann et al. ...... 707/205 |
| 2005/0240469 A1 | | 10/2005 | Rose et al. |
| 2006/0015415 A1* | | 1/2006 | Najmi ......................... 705/28 |
| 2006/0020512 A1 | | 1/2006 | Lucas et al. |
| 2006/0036507 A1 | | 2/2006 | Pujar et al. |
| 2006/0112099 A1 | | 5/2006 | Musgrove et al. |
| 2006/0149634 A1* | | 7/2006 | Pelegrin et al. ............. 705/22 |
| 2006/0265287 A1* | | 11/2006 | Kubo ......................... 705/26 |
| 2007/0027745 A1* | | 2/2007 | Ouimet ....................... 705/10 |
| 2007/0050272 A1 | | 3/2007 | Godlewski et al. |
| 2007/0177211 A1* | | 8/2007 | Eller et al. ............... 358/1.18 |
| 2008/0120206 A1* | | 5/2008 | Weiler et al. ............... 705/28 |
| 2008/0319857 A1 | | 12/2008 | Dobbins et al. |
| 2009/0099879 A1* | | 4/2009 | Ouimet ......................... 705/7 |
| 2009/0271245 A1* | | 10/2009 | Joshi et al. ................. 705/10 |
| 2010/0320109 A1* | | 12/2010 | Trumbauer et al. ......... 206/386 |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Combining horizontal and vertical analysis in antitrust: Antitrust Bulletin: V49 N4 pp. 821-839 Winter 2004.*
Keebler sharpens Demand Planning Process with mySAP supply chain: Busdiness wire New York, Apr. 19, 2001 p. 1.*
U.S. Appl. No. 60/374,892, filed Apr. 22, 2002, Krajec.
Abraham et al., "An Implemented System for Improving Promotion Productivity Using Store Scanner Data", Marketing Science, Summer 1993, vol. 12, No. 3, pp. 248-269.
Anon., "(A Lot of) Life After H. Ross: Electronic Data Systems", *Financial World*, vol. 162, No. 22, Nov. 9, 1993 (p. 50(2)), 3 pages.
"Beyond Markdown Management", summer/autumn 03, the 4caster, Issue 4, vol. 2, 4 pages.
Brown, "The Effects of Assortment Composition Flexibility on Operating Efficiency", (Abstract Only), *Dissertation Abstracts Int'l.*, vol. 55/08-A, available at least by 1994, (p. 2458).
"Retailers Manage Markdown Challenges Using i2 Solutions", Jan. 13, 2003, NRF 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.
Jensen et al., "Long-Term Construction Contracts: The Impact of Tamra '88 on Revenue Recognition", *Journal of Construction Education*, Spring 1997, vol. 2, No. 1, pp. 37-53.
Kelkar et al., Price Modeling in Standards for Electronic Product Catalogs Based on XML, 2002, pp. 366-375.
Melcher, "Local tech firm creates retail markdown tool", Mar. 24, 2000, Cincinnati Business Courier, 3 pages.
Profitlogic, available at http://webarchive.org/web/2002060311838/, available at least by Apr. 15, 2005, 22 pages.
Srinivasan et al., Concepts and strategy guidelines for designing value enhancing sales promotions, Journal of Product and Brand Management, vol. 7, No. 5, 1998, pp. 410-420.
Subrahmanyan et al., "Developing optimal pricing and inventory policies for retailers who face uncertain demand", Journal of Retailing, vol. 72, No. 1, Spring, 1996, 15 pages.
Wilson, "Changing the Process of Production", *Industrial Management*, vol. 37, No. 1, Jan./Feb. 1995 (pp. 1-2).
Guy, Classifications of retail stores and shopping centres: some methodological issues, GeoJournal, 1998, pp. 255-264, vol. 45, Kluwer Academic Publishers, Netherlands.
Office Action for U.S. Appl. No. 10/886,260, mail date Dec. 18, 2009, 21 pages.
Office Action for U.S. Appl. No. 10/886,260, mail date Dec. 8, 2008, 16 pages.
Office Action for U.S. Appl. No. 10/886,260, mail date Jul. 15, 2009, 21 pages.
Office Action for U.S. Appl. No. 10/898,892, mail date Apr. 9, 2009, 20 pages.
Office Action for U.S. Appl. No. 10/898,892, mail date Dec. 16, 2008, 14 pages.
Office Action for U.S. Appl. No. 10/898,892, mail date Dec. 17, 2009, 17 pages.
Office Action for U.S. Appl. No. 10/898,892, mail date Jul. 30, 2009, 19 pages.
Office Action for U.S. Appl. No. 10/899,385, mail date Aug. 4, 2009, 18 pages.
Office Action for U.S. Appl. No. 10/899,385, mail date Dec. 16, 2008, 19 pages.
Office Action for U.S. Appl. No. 10/899,385, mail date Jan. 27, 2010, 23 pages.
Office Action for U.S. Appl. No. 10/910,783, mail date Apr. 14, 2009, 24 pages.
Office Action for U.S. Appl. No. 10/910,783, mail date Dec. 2, 2008, 17 pages.
Office Action for U.S. Appl. No. 10/910,783, mail date Oct. 26, 2009, 23 pages.
Office Action for U.S. Appl. No. 10/911,226, mail date Apr. 16, 2009, 21 pages.
Office Action for U.S. Appl. No. 10/911,226, mail date Dec. 4, 2008, 12 pages.
Office Action for U.S. Appl. No. 10/911,226, mail date Jan. 26, 2010, 21, pages.
Office Action for U.S. Appl. No. 10/911,226, mail date Sep. 8, 2009, 20 pages.
Office Action for U.S. Appl. No. 11/008,085, mail date Aug. 21, 2008, 11 pages.
Office Action for U.S. Appl. No. 11/008,085, mail date Mar. 4, 2009, 16 pages.
Office Action for U.S. Appl. No. 11/008,085, mail date Sep. 30, 2009, 13 pages.
Office Action for U.S. Appl. No. 11/008,085, mail date Mar. 2, 2010, 14 pages.
Office Action for U.S. Appl. No. 11/008,646, mail date Feb. 11, 2009, 10 pages.
Office Action for U.S. Appl. No. 11/008,646, mail date Mar. 23, 2010, 10 pages.
Office Action for U.S. Appl. No. 11/008,646, mail date Sep. 28, 2009, 10 pages.
SAP Retail Merchandise and Assortment Planning, Product Brochure, Jan. 9, 2003, 4 pages.
SAP Retail Release 4.6 C. Copyright 2001, Apr. 2007, 65 pages.
Notice of Allowance for U.S. Appl. No. 10/898,892, mail date Apr. 14, 2010, 7 pages.
Notice of Allowance for U.S. Appl. No. 10/910,783, mail date Apr. 15, 2010, 7 pages.
Office Action for U.S. Appl. No. 10/886,260, mail date Apr. 30, 2010, 27 pages.
Office Action for U.S. Appl. No. 10/899,385, mail date Sep. 7, 2010, 23 pages.
Office Action for U.S. Appl. No. 11/008,085, mail date Mar. 22, 2011, 16 pages.
Office Action for U.S. Appl. No. 11/008,085, mail date Oct. 5, 2010, 14 pages.
Office Action for U.S. Appl. No. 11/008,646, mail date Dec. 2, 2010, 9 pages.

* cited by examiner

| TDR | TM | Reference article | TDR Cap. in pcs | Assigned IDR | IDR Cap. in pcs | Capacity index |
|---|---|---|---|---|---|---|
| Ty. 1111a | Suitcases | Shell type | 20 pcs per TDR | Ty. 1111a | 25 pcs per IDR | 1.25 |
| | | | | Ty. 1111b | 30 pcs per IDR | 1.50 |
| | | | | Ty. 1111c | 10 pcs per IDR | 0.50 |
| | | | | Ty. 1111d | 15 pcs per IDR | 0.75 |
| | | | | Ty. 1111e | 25 pcs per IDR | 1.25 |
| | | | | Ty. 1111f | 25 pcs per IDR | 1.25 |
| | | | | Ty. 1111g | 40 pcs per IDR | 2.00 |
| | | | | Ty. 1111h | 22 pcs per IDR | 1.10 |
| Ty. 1112a | Wallets | Std. wallet | 400 pcs per TDR | Ty. 1112a | 500 pcs per IDR | 1.25 |
| | | | | Ty. 1112b | 540 pcs per IDR | 1.35 |
| | | | | Ty. 1112c | 250 pcs per IDR | 0.63 |
| | | | | Ty. 1112d | 200 pcs per IDR | 0.50 |
| | | | | Ty. 1112e | 300 pcs per IDR | 0.75 |
| Ty. 1113a | Handbags | Ladies' bag | 50 pcs per TDR | Ty. 1113a | 55 pcs per IDR | 1.10 |
| | Backpacks | | | Ty. 1113b | 54 pcs per IDR | 1.08 |
| | School | | | Ty. 1113c | 40 pcs per IDR | 0.80 |
| | Business | | | Ty. 1113d | 45 pcs per IDR | 0.90 |
| | | | | Ty. 1113e | 30 pcs per IDR | 0.60 |

FIG. 5

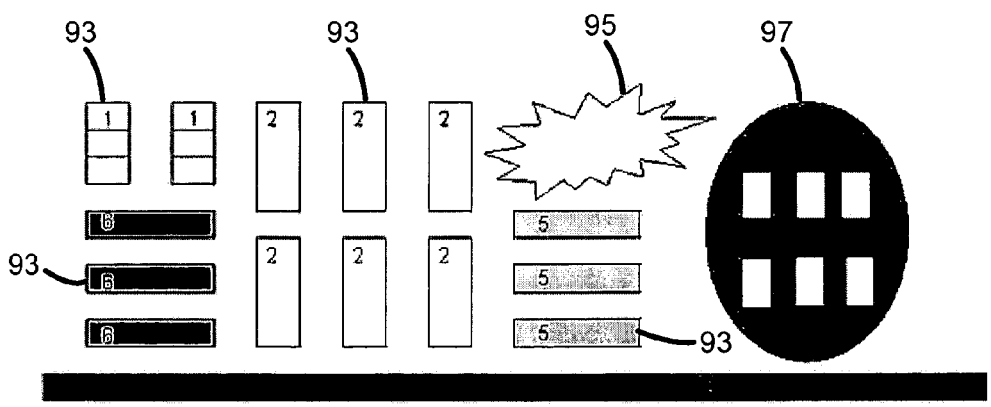

FIG. 6

Category 1

Capacity

| Price Level | 1 | 2 | 3 | 4 | 5 | 6 | 7 | 8 | 9 |
|---|---|---|---|---|---|---|---|---|---|
| 1 | | | | | | | | | |
| 2 | | | | | | | | | |
| 3 | | | | | Assort-ment35 | | | | |
| 4 | | | | | | | | | |

METHOD AND SYSTEM FOR PRODUCT LAYOUT DISPLAY USING ASSORTMENT GROUPS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

FIELD OF THE INVENTION

The present invention relates generally to the field of product layout display, and more specifically to performing product layout display based on information obtained on an assortment group.

BACKGROUND OF THE INVENTION

Business models are based on buying merchandise and services for one price and selling it for another. In the process, they incur spectacular costs marketing to prospective and existing customers, leasing stores, paying employees, buying and maintaining information technology, transporting, and, most importantly, buying and managing the merchandise itself.

Planning, at one level, is a strategic activity. The executives set business objectives and merchandise planners derive strategies to meet them: back to basics to reduce the style count, extended assortments with additional colors and styles, or new lines of business such as health & beauty. On another level, planning is tactical and operational. The plan influences how many styles and colors the retailer will carry. It influences how distributions are planned for stores. It influences when markdowns are expected to be taken for each style and color. It also influences which stores should carry each style.

One of the most important processes of such planning is assortment planning. Assortment planning provides answers to basic questions such as: Which product or service? How much of it? What colors? What sizes? What locations? Who is the target customer? When should it be offered? How long should it be offered? and so forth. Thus, the old adage, the right product, at the right place, at the right time, still holds true in today's retail marketplace, but with one important change. Sellers—whether traditional brick-and-mortar, e-commerce or a combination of the two—must have a compelling selection of merchandise for the right customer as well. Thus, an effective assortment planning process that provides the right products and services at the right locations at the right time is essential for successful modern business operation.

An effective assortment planning process is even more necessary in retail environments and, in particular, fashion retail environments. Retail environments and fashion retail environments often require that the business adjust to relatively fickle needs of the consumer.

Although assortment planning directly affects product selection, price, timing and micro-merchandising, it has often been de-emphasized due to hectic retail schedules. Extinguishing delivery fires and meeting marketing and financial planning obligations use valuable time, forcing companies to take the easy approach to merchandising: repeating assortment breadth and depth from previous seasons, creating store assortments based on store volume, and ranking items by sales volume alone.

Yet, to attract the right customer in today's increasingly competitive environment, assortment planning must focus on creating appropriate product breadth and depth of products based on the customer's desires and shopping patterns, taking into account lifestyles, climates, trends and more. Furthermore, assortment planning must present a compelling mix of products to illustrate the company's strategic vision.

Another important feature that is utilized for determining products to offer for sale at a store is the use of capacity planning. Capacity planning takes into account the available shelf space and floor space of a store, and based on that available space, or capacity, and based on assortment planning information, a precise number of different products can be ordered for a store, so as to be offered for sale at the store. Capacity planning may take into account different types of merchandise and different sales seasons (e.g., spring/summer and fall/winter seasons).

In view of the foregoing, it would be beneficial to provide a method and system that provides efficient implementation of product display based on assortment planning decisions and capacity planning decisions for merchandise to be sold at a store or a plurality of stores.

SUMMARY OF THE INVENTION

The present invention relates to systems and methods for performing product layout display using assortment groups.

According to a first exemplary embodiment, a method is provided for determining a product layout for a group of stores. The method includes defining an assortment as a group of stores. The method also includes defining an assortment version by assigning a first product to the assortment for a time period, thereby determining the time period during which the first product is in the assortment. The method further includes defining a layout module and assigning the layout module to the assortment, the layout module representing a display area of the store. The method also includes defining a layout module version that represents a product layout for the group of stores for the time period. The method still further includes providing the layout module information to a shelf optimization or ranging program. The method also includes receiving the optimized layout module information and inputting the optimized layout module information to the layout module version.

According to another exemplary embodiment, there is provided a system for determining a product layout for a store. The system includes means for defining an assortment as a group of stores. The system also includes means for defining an assortment version by assigning a first product to the assortment for a time period, thereby determining the time period during which the first product is in the assortment. The system further includes means for defining a layout module and assigning the layout module to the assortment, the layout module representing a display area of the store; and means for defining a layout module version that represents a product layout for the group of stores for the time period. The system still further includes means for providing the layout module information to a shelf optimization or ranging program. The system also includes means for receiving the optimized layout module information and inputting the optimized layout module information to the layout module version.

Yet another exemplary embodiment relates to a program product for determining a product layout for a group of stores. The program product includes machine-readable program code for causing, when executed, one or more machines to perform method steps. The method steps comprise defining an assortment as a group of stores. The method also includes defining an assortment version by assigning a first product to the assortment for a time period, thereby determining the time period during which the first product is in the assortment. The method further includes defining a layout module and assigning the layout module to the assortment, the layout module representing a display area of the store. The method also includes defining a layout module version that represents a product layout for the group of stores for the time period. The method still further includes providing the layout module information to a shelf optimization or ranging program. The method also includes receiving the optimized layout module information and inputting the optimized layout module information to the layout module version.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIG. 5 illustrates a small section of an exemplary theme structure for a large retail enterprise.

FIG. 6 shows a merchandise group structure.

FIG. 11 shows the process of FIG. 9 being used for assortment definition/planning process in the context of a specific product.

Figure 1:
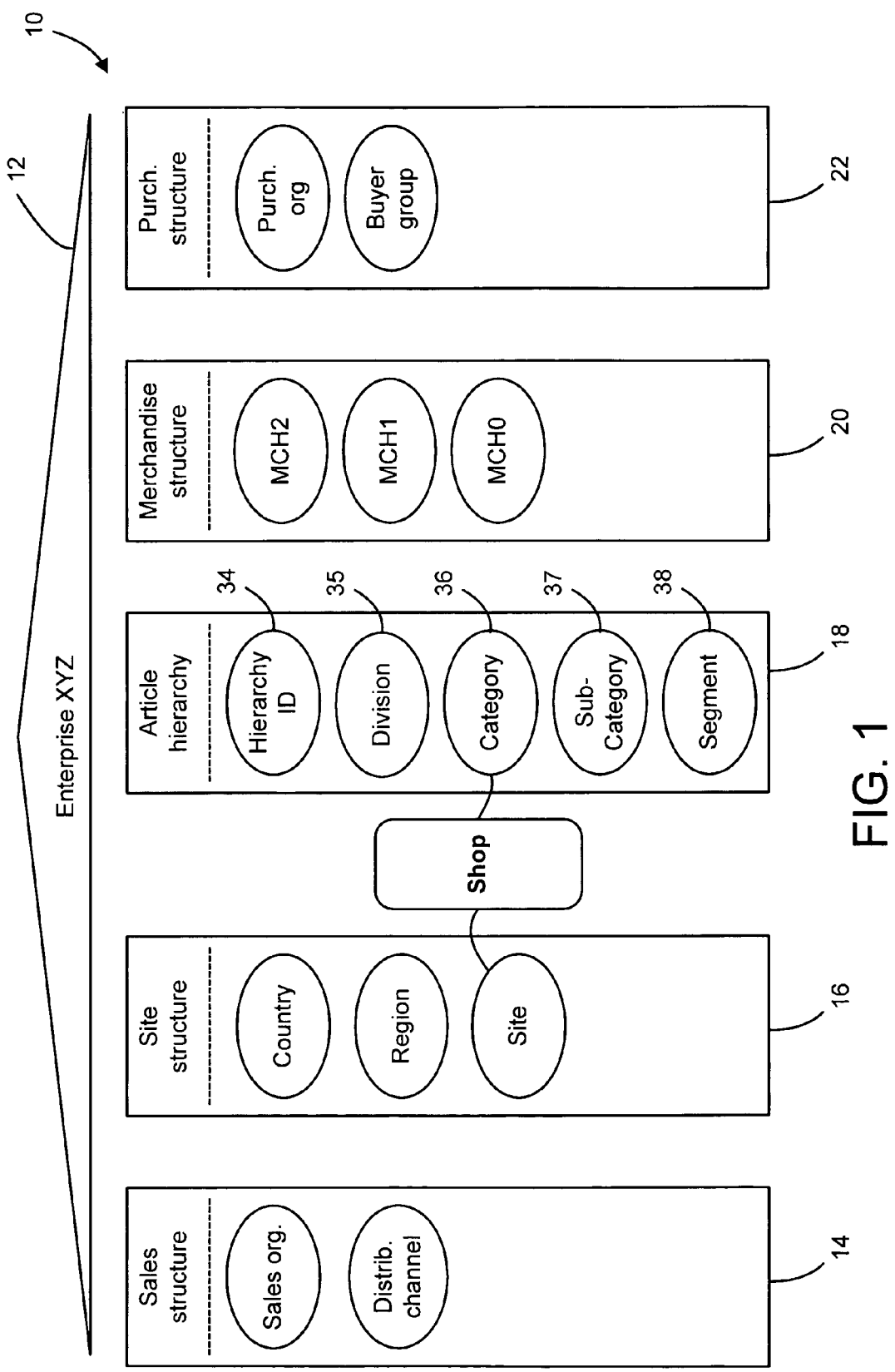
FIG. 1 is a general overview of an enterprise structure for a large retail company.

Before explaining several preferred embodiments of the present invention in detail it is noted that the invention is not limited to the details of construction or the arrangement of components set forth below or illustrated in the drawings. The particulars shown herein are by way of example and for purposes of illustrative discussion of the preferred embodiments only and are presented in a manner that is believed to provide the most useful and readily understood description of the principles and concepts of the present invention. In this regard, no attempt is made to show structural details of the present invention in more detail than is necessary to provide a fundamental understanding of the present invention. The description of the invention taken with the drawings is believed sufficient to make it apparent to those skilled in the art how several forms of the present invention may be embodied in practice. The invention is capable of other embodiments and being practiced or carried out in various ways. It is also noted that the phraseology and terminology employed herein is for purposes of description only and should not be regarded as limiting.

DETAILED DESCRIPTION OF THE PREFERRED EMBODIMENTS

FIG. 1 illustrates a general overview of an enterprise structure 10 for a company or enterprise 12 (e.g., "Enterprise XYZ") having five segments (or data structures): a sales structure 14, a site or store structure 16, an article hierarchy (or theme structure) 18, a merchandise hierarchy 20, and a purchasing structure 22. Enterprise 12 may be any type of company that regularly needs to perform merchandise and assortment definition and planning, such as a large retail company, a service provider, a non-retail supplier of goods, and the like.

Figure 2:
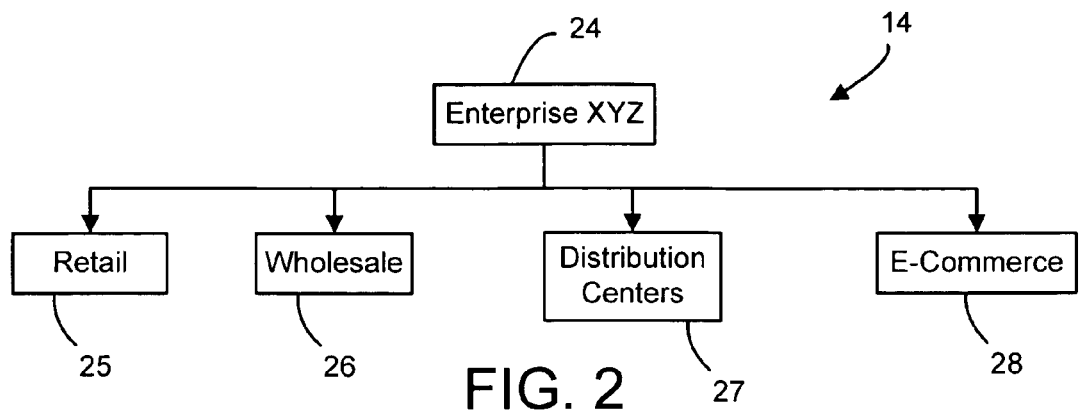
FIG. 2 an exemplary sales structure for a large retail company.

Sales structure 14 represents the different sales channels used by enterprise 12. For example, FIG. 2 illustrates one possible arrangement for sales structure 14 as configured for a large retail chain. Sales structure 14 in this example includes an enterprise level node 24 and four sales channel level nodes. The four sales channel nodes include a retail sales channel 25, a wholesale sales channel 26, a distribution center sales channel 27, and an e-commerce sales channel 28. Sales structure 14 may be customizable by a user to include additional or fewer levels, as well as different names, to better represent the sales channels associated with a particular enterprise.

Figure 3:
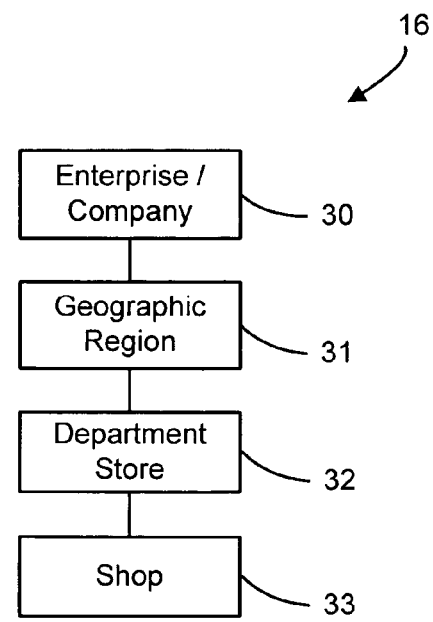
FIG. 3 shows a theme structure hierarchy.

Referring again to FIG. 1, site structure 16 represents the local, operative units within which the sale and logistics handling of merchandise (i.e., products or articles) or services takes place. Typical examples of such sites include stand-alone stores as well as department stores, which unify collections of shops or departments representing various consumer themes (e.g., merchandise categories presented to consumers in unified manner, individual shops in department stores, etc.). FIG. 3 illustrates one possible arrangement for site structure 16 as configured for a large department store chain. In this example, site structure 16 includes an enterprise level 30, a geographic region level 31 (e.g., NE, NW, SE, SW), a department store level 32, and a shop level 33. Site structure 16 may be customizable by a user to include additional or fewer levels, as well as different names, to better represent the sites associated with a particular enterprise.

In contrast to conventional stores, department stores typically do not have inventory-managing character for consumer merchandise, because inventory management on an article or value basis usually takes place at the shop level. Nonetheless, the department store can represent an overreaching inventory management level for consumable materials, advertising materials, and additionals. Although the department store conventionally groups shops at a physical address, this is not a requirement. For example, different shops can exist at separate physical locations and still be assigned logically to the same department store. Unless otherwise specified below, the term "store" may refer to a conventional store, a department store, or any of the individual shops or departments unified by a department store.

Referring again to FIG. 1, article hierarchy 18 represents a hierarchy of articles down to the segment level. As will become clear below, article hierarchy 18 represents one of many possible ways to hierarchically organize and view articles and make assortment decisions. In FIG. 1, article hierarchy 18 is illustrated with a hierarchy ID level (e.g., a number) 34, a division level 35, a category level 36, a subcategory level 37, and a segment level 38. Article hierarchy 18 may be customized by a user to include additional levels (e.g., a subsegment level below segment level 38) or fewer levels, as well as different names, to better represent the merchandise (e.g., products or articles) layout associated with a particular enterprise. According to one possible implementation of the invention, theme structures may be defined with up to 10 levels.

Although the names and number of levels in article hierarchy 18 can be customized, one level in article hierarchy 18 must be defined as the "category" level. The category level may be selected to represent the independent presentation spaces in a store that are devoted to merchandise categories presented to consumers in a unified manner. In the department store context, for example, the category level in article hierarchy 18 may be selected to represent differentiated groupings of shops in the department stores such as confectionaries, menswear departments, and ladies wear departments. Alternatively, a lower level in article hierarchy 18 may be selected to represent the different independent presentation spaces for subgroups of merchandise (e.g., long-arm blouses, short-arm blouses, trousers) within each shop in a department store. Other criteria for selecting the category level may also be used.

In an aspect of the invention, the level in article hierarchy 18 selected to be the category level has several additional properties that are unique to that level. One unique property of the category level is that stores can be assigned only to that level. In FIG. 1, for example, the assignment of shops in site structure 16 to nodes in category level 36 of article hierarchy 18 shows that category level 36 has been defined as the category level. These assignments make sense primarily in the context of department stores, wherein the stores that are assigned to a category are the shops in different department stores which (primarily) present goods from this category. For example, in most department stores there is a section for "men's fashion." Hence, a category may be defined in the system for "men's fashion," and this section in the department store may be treated as a shop in the system.

Another unique property of the category level in article hierarchy 18 is that the assignment of articles (as described in detail below) to hierarchy 18 must be unique below the category level. That is, each article can be assigned only once to a node at or below a particular category node. By contrast, the same article can be assigned again to a different node at or above the category level (e.g., the division level).

Figure 4:
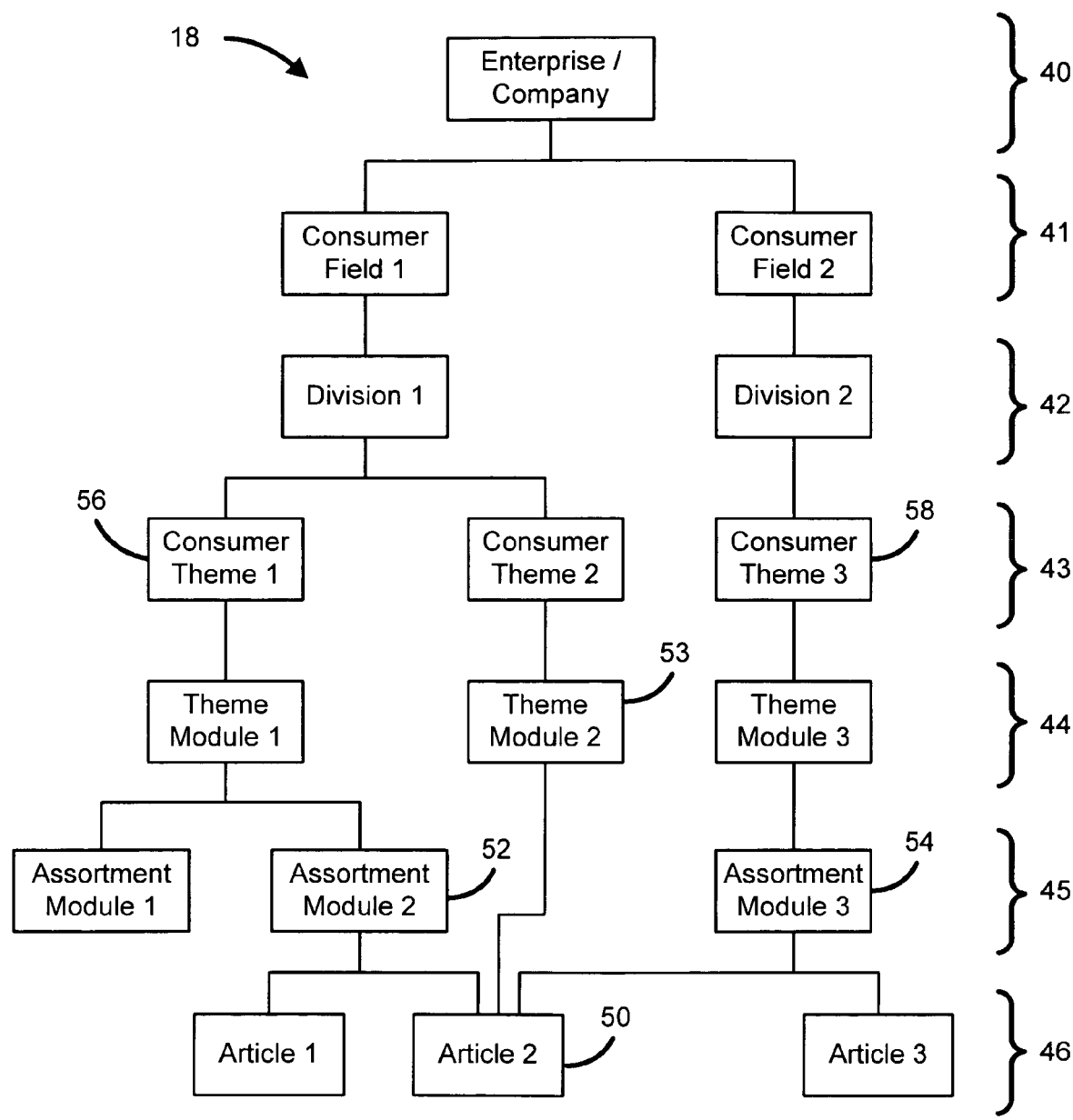
FIG. 4 shows a more detailed view of a theme structure hierarchy.

Reference is now made to FIG. 4 to further illustrate how article hierarchy 18 may be used by an enterprise to better represent merchandise based on, for example, the arrangement of articles and products for displayed in the stores and shops. In this example, article hierarchy 18 has been defined to include seven distinct levels, comprising: an enterprise level 40, a consumer field (CF) level 41, a division level 42, a consumer theme (CT) level 43, a theme module (TM) level 44, an assortment module (AM) level 45, and an article level 46. CF level 41 may be selected to represent different high level groupings of merchandise (e.g., fashion, sport). CT level 43 may be selected to represent merchandise categories presented to consumers in unified manner, such as the individual shops in a department store. TM level 44 may be selected to represent the different independent presentation spaces for subgroups of merchandise (e.g., long-arm blouses, short-arm blouses, trousers) within each shop in a department store. AM level 45 may be selected to group articles according to various criteria such as the time periods during which such articles will be displayed, the stores to which they will be assigned, etc.

According to an aspect of the invention, the relationships between the various nodes in article hierarchy 18 may be as follows. The relationship between the nodes of each level above AM level 45 and the node(s) in the next lower level may be 1:n. That is, each node in TM level 44 may be assigned or linked to one or more child nodes in AM level 45, while each node in AM level 45 is linked to exactly one parent node in TM level 44. In contrast to the nodes above AM level 45, the relationships between the nodes in AM level 45 and the nodes in article level 46 may be n:m. That is, a single node in AM level 45 may be linked to one or more child nodes in article level 46, while each node in article level 46 may be linked to one or more parent nodes in AM level 45 so long as each parent node in AM level 45 is in a different category. Thus, as illustrated in FIG. 4, article node 50 may be linked to both AM node 52 and AM node 54 in AM level 45 because nodes 52 and 54 are assigned to different categories. In particular, AM node 52 is assigned to the category represented by CT node 56 and AM node 54 is assigned to the category represented by CT node 58. In some embodiments, individual articles in article level 46 may be assigned directly to nodes above AM level 45. For example, article node 50 may be linked directly to TM node 53. This assignment is permissible because TM node 53 is assigned to a different category than either CT node 56 or 58. In one possible implementation of the invention, the user can set a flag to indicate whether the assignment of individual article nodes to more than one parent node in AM level 45 and/or to other higher level nodes is allowable or prohibited.

After a theme structure has been defined for a company such as described above, one or more business types may be defined for each consumer theme (e.g., each shop in a department store) to further facilitate assortment definition and planning as described below. A business type definition may be a grouping of all stores of a consumer theme, grouped according to criteria level and capacity, using a standardized procedure. Hence, the business type may be defined for every reasonable combination of level type and capacity for a consumer theme. As such, business type definitions can be used to provide strategic grid spacing of stores according to presentation capacity and level, in consultation with division and sales, taking account of location-specific circumstances. The aim of the level type is to describe a CT/store (e.g., a shop in a department store) with regard to the level of the assortment (defined, for example, by price level, brands features, and so on). Thus, the level type of a CT/store is determined based on question such as, in which price categories, with which brands, and which special features is an assortment carried. The capacity type aims to describe a CT/store with regard to its capacity size expressed in, for example, a number of template display racks. Thus, the capacity of a CT/store is determined based on questions such as, how many articles can be carried, with which width and depth.

According to an aspect of the invention, one or more business types (BT) may be defined for each consumer theme. An exemplary view 91 of a business type definition (with a rule set for capacity index) is shown in FIG. 5. The capacity index indicates a capacity relationship between template display racks (TDR) and individual display racks (IDR). Although not illustrated in view 91, each BT definition may include a specific time reference (e.g., valid-from/valid-to dates). In addition, the capacity type and level type of each BT may be defined by numbers N and M. In this case, the number of the capacity type for each business type represents a particular capacity range (e.g., N=1 may correspond to a capacity index between 0 and 1.0, N=2 may correspond to a capacity index between 1.0 (inclusive) through 2.0, etc.). Similarly, the number of the criteria level for each business type represents the "level" of articles offered for sale (e.g., M=0 may correspond to a flagship store, M=1 may correspond to a high end store, M=2 may correspond to a medium end store, and M=3 may correspond to a low end store). Instead of determining business types based on criteria level and capacity, business types may be determined based on or in combination with other relevant criteria such as historical consumption data by price level.

After the business types have been defined, one or more layout modules may be assigned to each business type definition to facilitate assortment planning such as described below. The layout module provides a pictorial view of the areas in the stores of the selected business type that are available to sell a particular consumer theme. For example, separate regions of the stores may be shown as separate "blocks" on a computer screen, whereby their respective locations and sizes correspond to their actual locations and sizes in the stores. For example, FIG. 6 shows an exemplary assignment plan including a plurality of layout modules 93 (indicated as rectangles) of various capacities. FIG. 6 also illustrates a space 95 for promotions/close-outs and another space 97 for fashion merchandise. This information is obtained beforehand and is stored in a memory for retrieval when particular stores or business types are selected.

Figure 16:
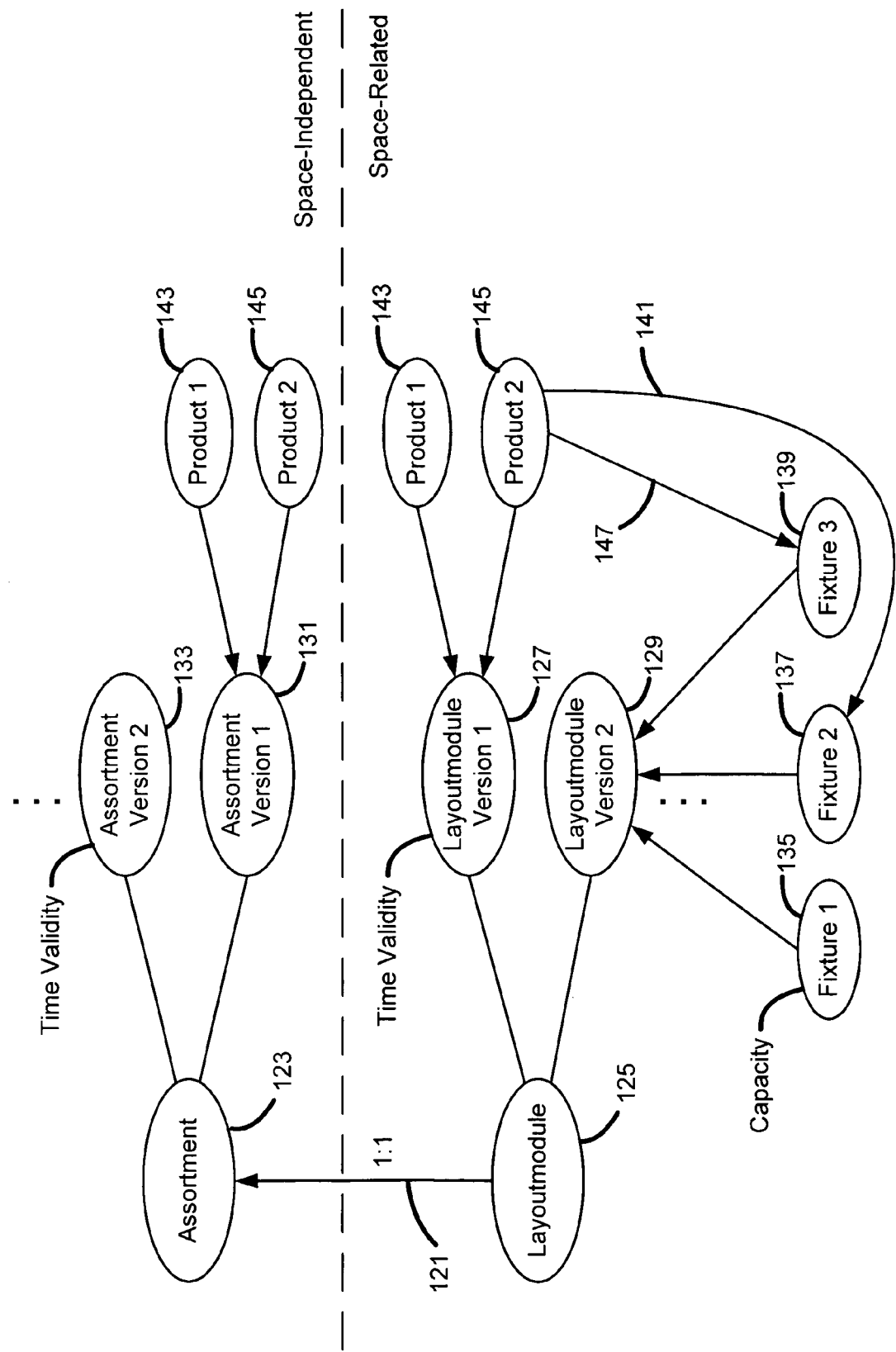
FIG. 16 is a diagram showing space-independent and space-related assignments of products to assortments.

An assortment is assigned on a one-to-one basis to a layout module, as seen in the diagram of FIG. 16, for example. Layout modules represent display areas of a store, and can be used for basic products that are displayed on shelves, in which the display area is to be planned and optimized by utilizing the present invention. A layout module can have different versions, as seen in FIG. 16. Each layout module version is assigned a validity period (e.g., summer/fall season, spring season, etc.). Different versions of one layout module do not overlap with other versions of the same layout module. The same is true for assortment versions. The versions of the layout module represent the changes in the respective shelves (e.g., the products provided on the respective shelves) over a period of time.

By assigning a layout module to an assortment, the assortment versions that are defined for the assortment will automatically define the layout module version. As the assortment version is normally defined during a planning step, the creation of a layout module version or versions will typically happen after the assortment and the respective assortment versions have been released from planning. In other words, the layout module and the layout module versions are the operational representations of an assortment and assortment versions.

Figure 7:
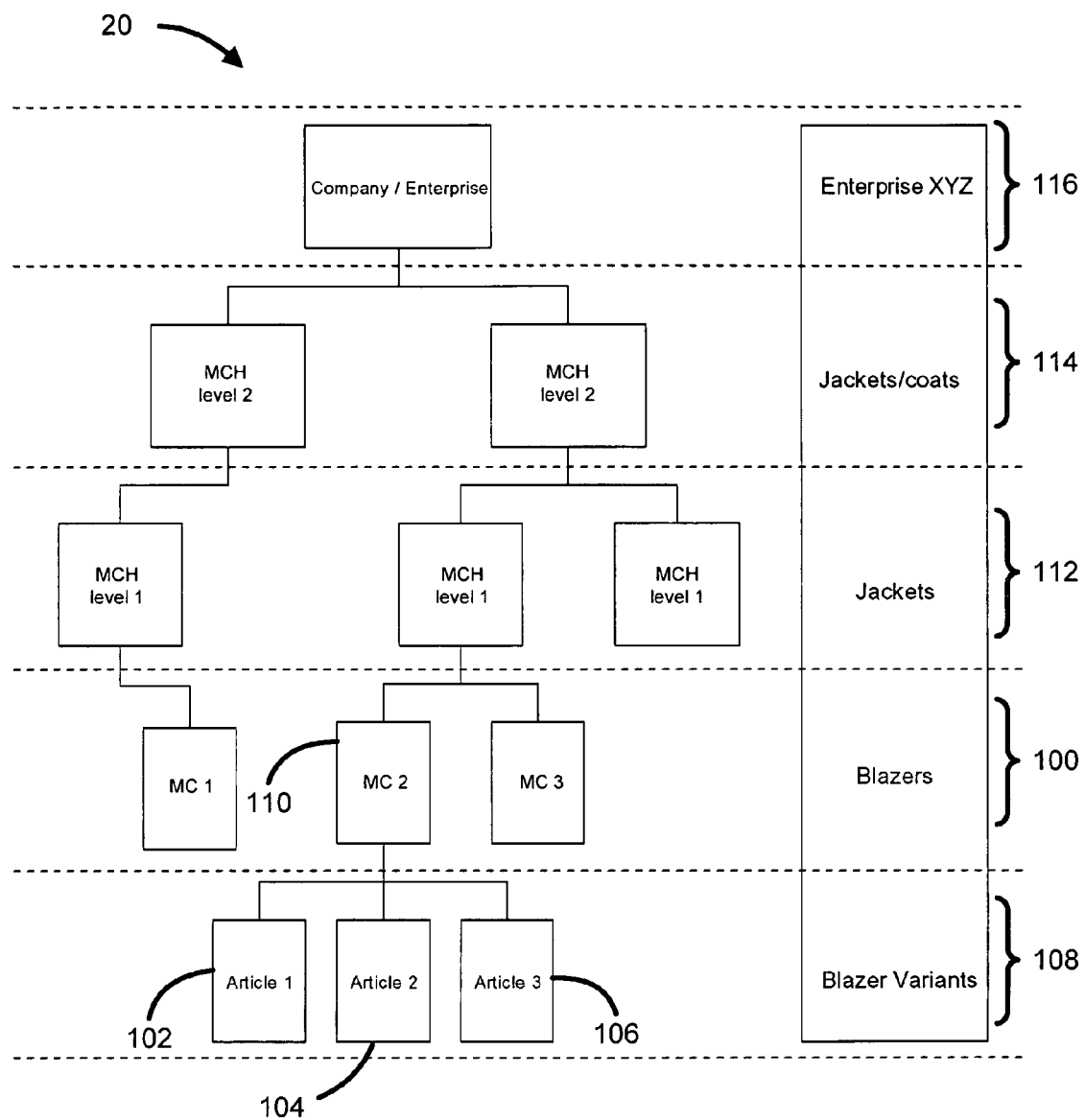
FIG. 7 shows a global assortment that links together a plurality of stores and a plurality of products at specific times.

Referring again to the five segments of enterprise structure 10 described with reference to FIG. 1, merchandise hierarchy 20 provides an alternative way of hierarchically organizing and viewing articles and making assortment decisions. One possible construction of merchandise hierarchy 20 is shown in FIG. 7. Merchandise hierarchy 20 represents a long-term article grouping in a classification structure that is independent of the store structure and merchandise presentation layout. Instead, merchandise is grouped in hierarchy 20 based on common inherent characteristics of the merchandise (e.g., all beverages may be grouped together regardless of their type and how or where they are displayed in the stores).

In FIG. 7, a merchandise (MC) level 100 represents the lowest level in hierarchy 20. This means that different articles that are assigned to the same MC node usually have at least the same characteristic(s) represented by the MC node. For example, articles 102, 104 and 106 (comprising three blazers having different styles, sizes and/or colors) in an article level 108 are assigned to a single MC node 110 and thus have at least the same characteristic(s) (e.g., they are all blazers) represented by MC node 110. According to an aspect of the invention, each article is assigned to exactly one MC node in hierarchy 20, and multiple MC nodes can be grouped together to form merchandise hierarchy (MCH) levels. For example, merchandise hierarchy 20 is illustrated with a first MCH level 112 (comprising a "jackets" category) immediately above MC level 100, and a higher MCH level 114 (comprising a "jackets/coats" category) above MCH level 112. Similar to article hierarchy 18, the topmost layer in merchandise hierarchy 20 is an enterprise level 116. The nodes in the lowermost level in hierarchy 20 and in similar merchandise group hierarchies may be referred to as merchandise categories. Thus, categories may represent differentiated, independently controllable group of articles and/or services that consumers recognize as different and/or exchangeable to satisfy a need.

A merchandise hierarchy may be formed for various reasons. For example, it may be formed to: (i) plan an assortment (as described in detail below), (ii) enable structured analyses in the information system and the planning of target and actual values at the MC level, and (iii) save common data (such as conditions) at superior levels to reduce storage space. According to an aspect of the invention, the following information may be defined for each MC node: price, color, and size groups; validity periods; n characteristics, and status values. In this embodiment, colors may be saved hierarchically as main colors or single colors. The main colors can have various characteristic values, which represent the single colors. In this case, the single colors are variant-creating characteristics. Accordingly, a merchandise group hierarchy having this structure would allow for analysis of main colors, single colors, and attribute values.

The characteristics of articles in a merchandise hierarchy may be used for classification. Characteristics represent defined properties of an object, such as the color of a blouse. Characteristics help to differentiate objects from one another and find specific articles in the information system (e.g., list all articles with characteristic value "Red" of the "Color" characteristic). Characteristics can be either variant-creating (i.e., used in the definitions of the article variants) or purely informative. According to an aspect of the invention, two or three-dimensional variant-creating characteristics can be defined for each MC node.

According to another possible implementation of the invention, below the MC level, and thus below the entire merchandise hierarchy, characteristic profiles may be defined to segment or specialize the merchandise hierarchy. This may be done to simplify the creation of new generic articles, variants, and single articles.

In this implementation of the invention, a characteristic profile may be used to define the set of values for a characteristic that are permitted in that particular profile. For example, a characteristic profile called "Ladies' sizes, Germany" could define the sizes 34 to 48. Multiple characteristic profiles can be created for multiple merchandise groups. A characteristic profile can be assigned several times within the merchandise group hierarchy. Thus, every article that is assigned to a merchandise group can optionally be assigned to a characteristic profile. According to an aspect of the invention, the relationship between characteristic profiles and merchandise groups is n:m. That is, a single characteristic profile can be linked to multiple merchandise groups, and vice versa.

As persons skilled in the art will appreciate, the use of characteristic profiles provides several advantages. For example, characteristic profiles can be used to (i) group sets of colors and sizes, (ii) assign them to the relevant merchandise groups, and (iii) select the suitable profile when creating articles.

Returning again to FIG. 1, purchasing structure 22 models the areas of responsibility and authority in purchasing. It consists of several buyer groups below each purchasing organization. According to an exemplary embodiment, each article is assigned to a unique buyer group. The unique assignment of buyer groups to merchandise groups is preferred, but not required.

Turning now to FIGS. 8–15, a number of aspects will be presented for performing assortment definition and planning using the structures, hierarchies, business type definitions, layout modules and other features described above to both speed up and simplify the assortment definition and planning processes. Although the description of assortment definition and planning is presented below in the context of a retail planning cycle, the present application is not limited to retail goods or planning cycles.

In accordance with one aspect of the invention, assortment definition and planning can be performed for various types of merchandise such as fashion merchandise and regular (e.g., stackable, non-fashion, basic, etc.) merchandise. As persons skilled in the art will appreciate, assortment definition and planning for fashion may differ from assortment definition and planning for regular merchandise for various reasons. For example, assortment definition and planning for fashion generally involves: (1) a higher proportion of new articles; (2) shorter life cycles than the assortment planning horizon, and different, reduced possibilities for short-term replenishment; and (3) capacity use is subject to fluctuations within an assortment planning period. Thus, assortment definition and planning for different types of merchandise may be handled differently. In one possible implementation of the invention, for example, assortment planning for regular merchandise may be performed at the theme module level and from month-to-month, while assortment planning for fashion may be performed at the consumer theme level and from season-to-season.

In the various aspects of assortment planning discussed below, assortment definition and planning for an enterprise may be performed using both local assortments and global assortments. When a store or distribution center is first created, an assortment with the same name is also created. This may be referred to as a local assortment. When articles are listed for these local assortments, they can be managed in the respective store in a single step.

Assortments can also be defined which include several stores. These may be referred to as global assortments. Merchandise quantities can be planned for these global assortments, and thus for a group of stores, in the assortment planning processes described below. Articles that are listed for a global assortment can thus be managed for all assigned stores at one time.

Figure 8:
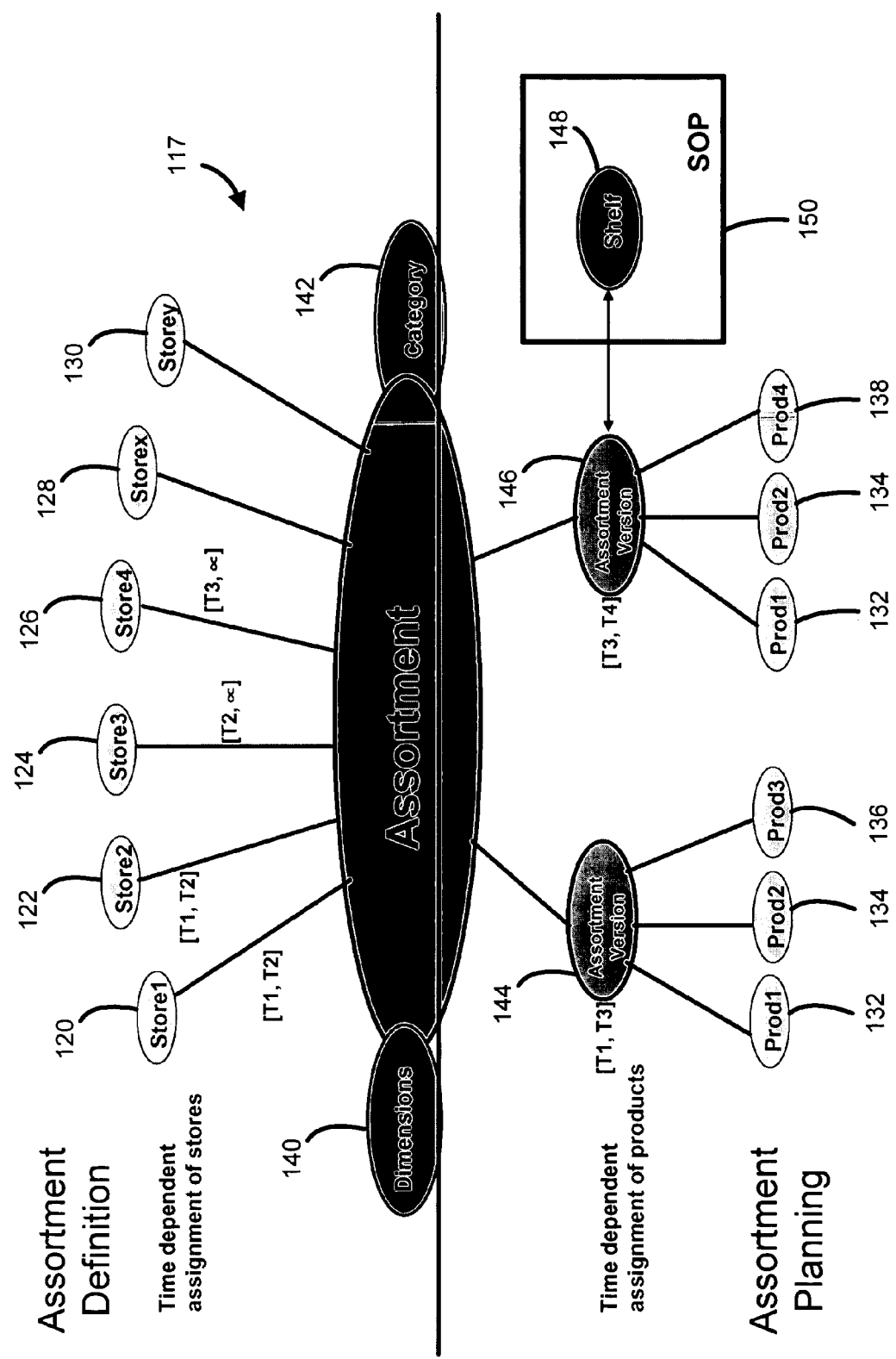
FIG. 8 is a diagram illustrating the portions of an assortment provided by assortment definition and assortment planning.

With the foregoing in mind, FIG. 8 illustrates a diagram 117 including a global assortment 118 that links together a plurality of stores 120, 122, 124,126,128 and 130 with a plurality of articles 132, 134,136 and 138. According to one possible implementation of the invention, articles are always linked to an assortment (either local or global), rather than directly to retail sites.

Global assortments such as assortment 118 may be classified according to assortment type. Assortment type refers to an assortment attribute that makes it possible to control the strategic direction of the assortment and its handling during assortment design/planning and procurement. In one embodiment, the possible values for the assortment type may be configured by the user. For example, assortments can express the following types: standard assortment—fashion; supplementary assortment—fashion; and regular (e.g., non-fashion) assortment.

Assortment 118 may also be characterized by one or more assortment dimensions 140. In general, assortment dimensions are attributes of an assortment that can be used during an assortment definition process to group retail sites together to design standardized assortments. That is, the assortment dimensions are used to group together retail sites with similar characteristics to form an assortment that applies to all stores in the group. Retail sites can be grouped differently for different assortment types, i.e., different dimensions can be used as grouping criteria. According to an aspect of the invention, an assortment can be defined using up to three assortment dimensions. The respective value range or level of the assortment dimensions may be defined and configured by a user. The value range or level of an assortment dimension can be defined differently for each assortment type. By way of example, possible assortment dimensions may include the following retail site characteristics: capacity, price level/grade (high fashion, essential, basic) or sales for a certain group of merchandise, geographical region or location, climactic zone (warm weather, cold weather), demographics (urban, suburban), retail concept, and so on.

With the foregoing in mind, an exemplary assortment may comprise a plurality of retail sites (e.g., store consumer themes or shops in a department store) grouped by category (e.g., consumer theme) with regard to price level/grade and capacity type. Grouping stores by price level and capacity is equivalent to grouping stores by business type as discussed above. In this example, one assortment dimension is the capacity, which may be represented by the following values: "0" to "9" for assortments with type "standard assortment—fashion" and "supplementary assortment—fashion;" and "1" to "6" for assortments with type "regular assortment." The other assortment dimension in this example is the price level/grade, which may be used only for assortment type "standard assortment—fashion" with the four values "1"—high-priced, "2"—mid-priced, "3"—low-priced, and "0" for exceptional cases (e.g., flagship stores and showpieces).

Referring again to FIG. 8, assortment 118 may also be characterized by a category 142 (e.g., category level 36 in FIG. 1 or consumer theme level 43 in FIG. 4). Alternatively, assortment 118 may be characterized by another level in article hierarchy 18 such as subcategory level 37 or segment level 38 in FIG. 1. In assortments characterized by store category, two of the three assortment dimensions can be classified as, for example, level type and capacity type. Accordingly, a matrix-like definition of the store types can be mapped. By selecting a certain level type, the corresponding capacity types (e.g., extra small, small, medium, large, extra large) can be planned first. The planned quantities can then be copied to assortments with the same capacity type, but an alternate level type.

Referring once again to FIG. 8, articles 132-138 are not directly assigned to assortment 118. Instead, articles 132-138 are linked to assortment 118 by assortment versions 144 and 146 during assortment planning. In the illustrated implementation of the invention, each assortment version 144, 146 is active or valid for a specified period of time (e.g., valid-from/valid-to dates). For example, articles 132, 134 and 136 are linked to assortment 118 by assortment version 144, which is active between dates/times T1 and T3. Similarly, articles 132, 134 and 138 are linked to assortment 118 by assortment version 146, which is active between dates/times T3 and T4. As persons skilled in the art will recognize, the foregoing time dependencies of the assignments of articles 132-138 to assortment 118 provides for automatic regular (e.g., every month or six weeks) releases of merchandise in the stores to maintain assortment freshness.

According to an exemplary embodiment, each assortment version 144, 146 may be linked to one or more shelves 148 in each store assigned to assortment 118. Alternatively, each assortment version 144, 146 may be linked to one or more display racks (which may have one or more shelves assigned thereto), or one or more layout modules (which may have one or more display racks or shelves assigned thereto). Display racks, shelves and similar apparatuses used for product display may generally be referred to herein as fixtures. If desired, a space optimization program (SOP) 150 may be used to determine the optimum layout of articles for each assortment version 144, 146 on a fixture.

Before turning to the remaining aspects of the embodiment illustrated in FIG. 8, some additional details on assortment versions, layout modules and fixtures will be provided with reference to FIG. 16. In this illustration, an upper portion shows the space-independent assignments of products 143 and 145 to an assortment 123, while a lower portion shows the space-related assignments of products 143 and 145 to a layout module 125, which in turn is assigned to assortment 123. In this embodiment, "space-related assignments" are specific to a particular physical layout or placement of the products in a display area of a store. By contrast, "space-independent assignments" are not specific to a particular physical layout or placement of the products in a display area.

In the upper half of FIG. 16, products 143 and 145 are both assigned to assortment 123 through a single assortment version 131. In an exemplary embodiment, assortment version 131 is automatically created by the system when products 143 and 145 are assigned to assortment 123 for a particular validity period. Assortment version 131 has a time validity period corresponding to the validity period for which products 143 and 145 were assigned to assortment 123. The assignment of products 143 and 145 to assortment 123 through assortment version 133 is space-independent.

Figure 13:
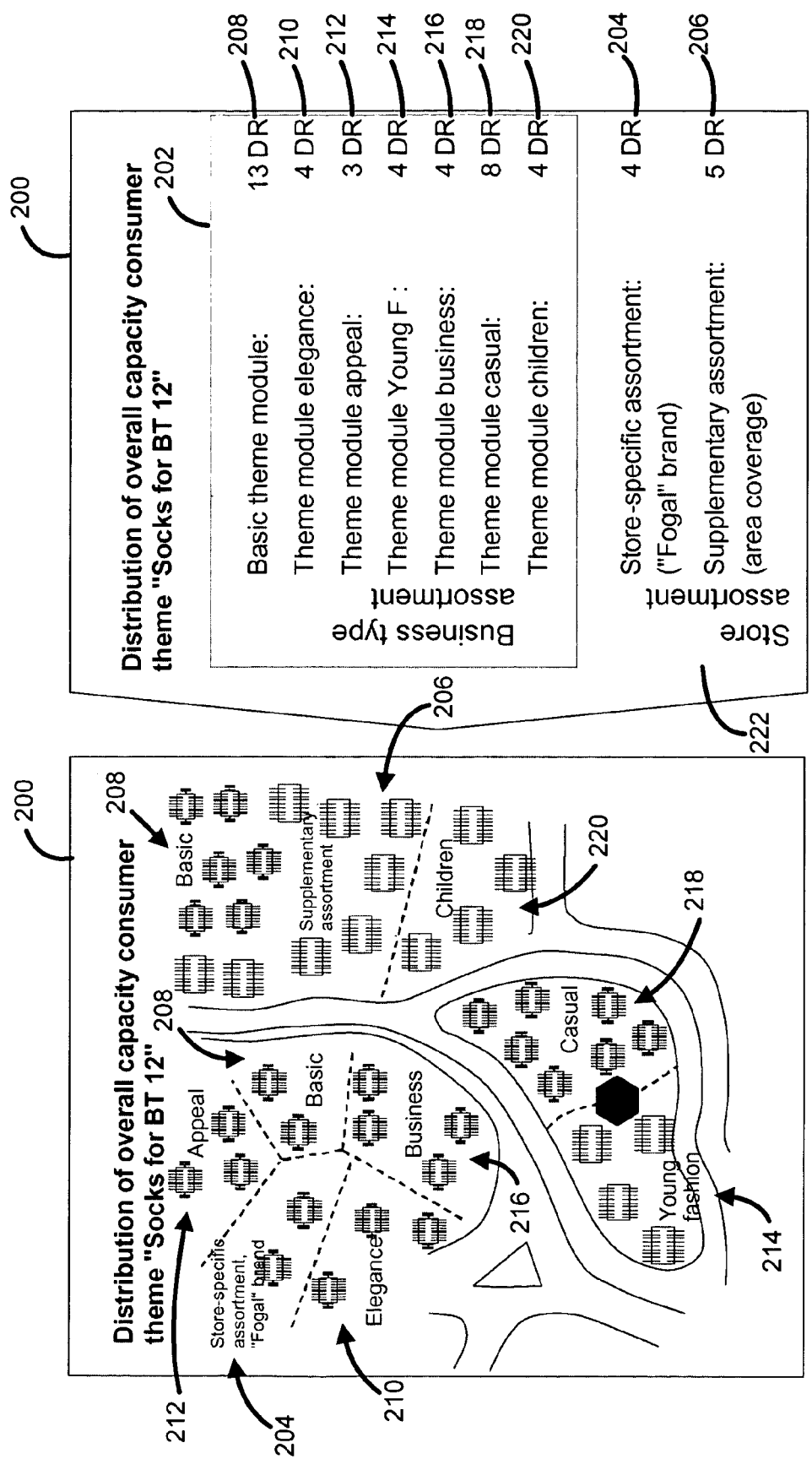

In the lower half of FIG. 13, products 143 and 145 are both assigned to layout module 125 through a layout module version 127. As explained above, layout modules represent physical display areas of a store to which one or more products and one or more fixtures can be assigned. Normally, layout modules are used for basic products that are displayed on a shelf and where the display area needs to be planned and optimized. Layout modules are typically assigned 1:1 to assortments.

When layout module 125 is assigned to assortment 123 and assortment 123 is released, an exemplary embodiment of the system automatically creates layout module versions 127 and 129. Layout module versions 127, 129 correspond 1:1 with assortment versions 131, 133, respectively. Accordingly, the validity periods for layout module versions 127 and 129 are taken from the validity periods for assortment versions 131 and 133, respectively. Typically, the validity periods of different layout module versions do not overlap, just as the validity periods of different assortment versions do not overlap. Layout module versions 127, 129 of layout module 125 represent the changes in the respective shelves.

As explained above, when layout module 125 is assigned to assortment 123, assortment versions 131, 133 defined for assortment 123 are used by the system to automatically define layout module versions (e.g., validity and product assignment) 127, 129. As assortment versions 131, 133 are normally defined during the planning step, the creation of layout module versions 127, 129 usually happens after assortment 123 and the respective assortment versions 131, 133 have been released from planning. In this way, layout module 125 and the associated layout module versions 127, 129 could be considered the operational representations of assortment 123 and the associated assortment versions 131, 133.

Fixtures 135, 137, 139 can be assigned to an assortment version that represents a layout module (in a 1:1 relationship), or they may be assigned directly to a layout module such as to layout module version 129 shown in FIG. 16. As explained above, a fixture represents any apparatus that is used to physically display products. It can be an individual shelf, a complete display rack with multiple shelves, or even multiple display racks (depending on the level of detail that the customer wants to use). When a product is assigned to a layout module version, an indication should be provided as to which fixture(s) the product should be placed. For example, lines 141 and 147 indicate that product 145 is to be placed on fixtures 137 and 139, respectively. Fixtures do not themselves have validity periods. As a fixture is assigned to a layout module version, the assignment is automatically valid for the complete validity period of the layout module version.

Returning now to the embodiment illustrated in FIG. 8, the assignment of stores 120-130 to assortment 118 during assortment definition also includes time dependencies. For example, stores 120 and 122 may be linked to assortment 118 between dates/times T1 and T2, while stores 124 and 126 may be assigned to assortment 118 starting at dates/times T2 and T3, respectively. In the illustrated embodiment, the assignments of the latter two stores 128 and 130 to assortment 118 is not time dependent, i.e., stores 128 and 130 will remain in assortment 118 until such time as assortment 118 is canceled or changed. The time dependencies of the store assignments may be stored in a data structure that also stores the store assignments.

As indicated in FIG. 8, the assignment of stores to an assortment (i.e., the upper half of diagram 117) may be referred to herein as assortment definition. By contrast, the assignment of articles to an assortment (i.e., the lower half of diagram 152) may be referred to herein as assortment planning. Of course, persons skilled in the art will recognize that different retail merchants may utilize different terms for referring to these two concepts and hence the specific terms of assortment definition and assortment planning should be understood as provided merely for purposes of facilitating explanation of the various implementations of the invention.

Figure 9:
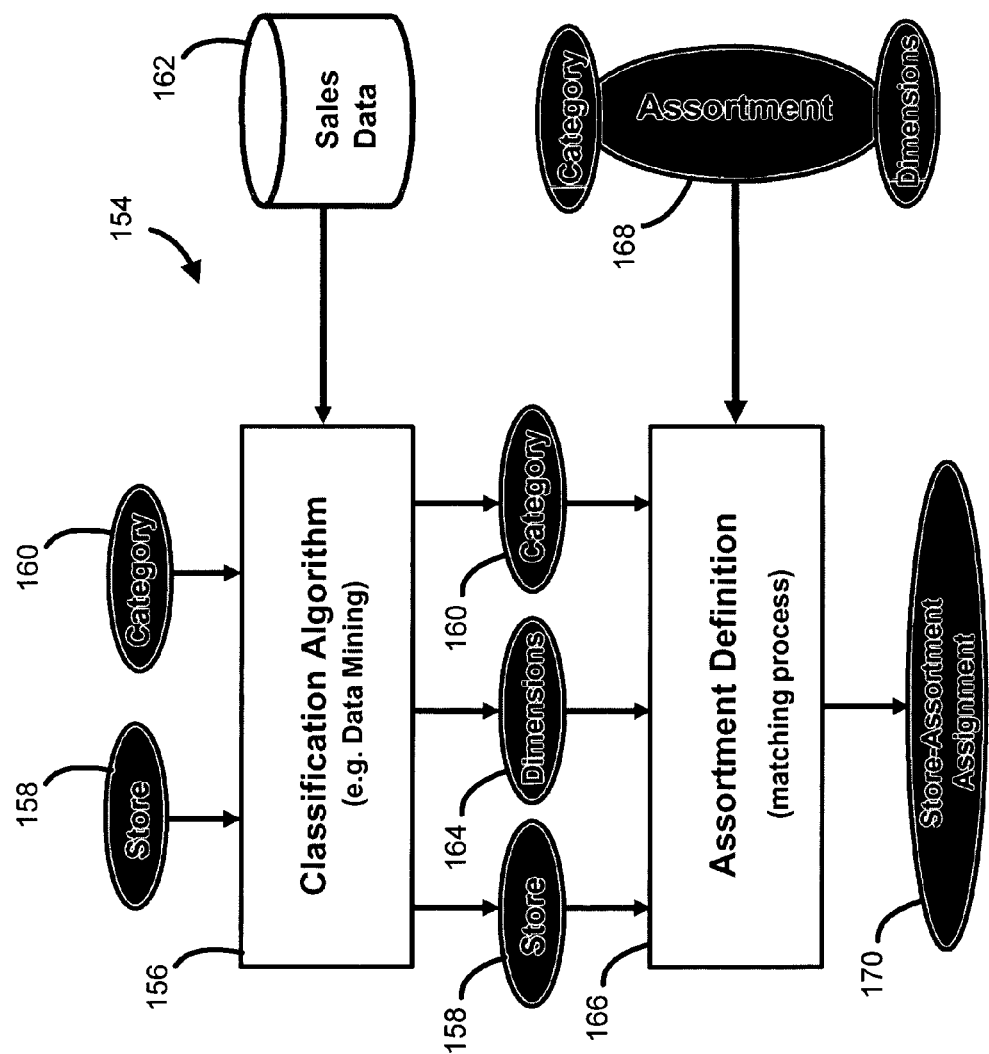
FIG. 9 is a data-flow diagram showing an exemplary process for performing assortment definition/planning.

Referring now to FIG. 9, a data-flow diagram shows an exemplary process 154 for performing assortment definition (i.e., defining assortment objects and the store assignments). According to an exemplary implementation of the invention, process 154 includes a classification algorithm engine 156 that receives inputs such as store information 158, category information 160, and sales information 162. The source(s) of input information provided to engine 156 may comprise a keyboard, mouse, or similar input device. Alternatively, the source(s) of input information provided to engine 156 may comprise one or more storage systems, such as a database. As another alternative, the source(s) of input information to engine 156 may comprise one or more computer systems that are locally or remotely connected to engine 156. In the illustrated implementation of the invention, for example, sales information 162 is shown as being provided from a database which contains historical transaction data (e.g., sales data from a comparable period in a prior year, which may be adjusted for recent sales trends). Sales data may also include forecasted or projected sales transaction data for a future time period (e.g., the upcoming season). Forecasted sales data may also be based on a markdown profile for an article or group of articles.

Regardless of the source(s) of input information 158-162, classification engine 156 performs a classification algorithm that mines the input information to identify one or more dimensions 164 that may be suitable for characterizing the stores that are eligible for inclusion in the assortment. After completing this task, classification engine 156 provides the identified dimension information 164 to an assortment definition engine 166 along with the original input information (e.g., store information 158 and category information 160) or a subset thereof.

Assortment definition engine 166 uses the dimension information (possibly after approval by a user) and other input information (e.g., information 158-160) along with previous and existing store assignments and assortment information 168 to perform a matching process that clusters or groups stores into proposals for store-assortment assignments 170. The matching criterion is based on the similarity of dimension values of stores (e.g., as found by the classification algorithm) to the dimension values, which may be assigned manually to the assortment object. The proposed store-assortment assignments 170 may be presented to management for approval and release and/or used as inputs to one or more downstream processes without review. The foregoing process may be utilized to automatically generate proposals of suitable store groupings (e.g., by business type) for assortments as well as when to implement them.

Figure 10:
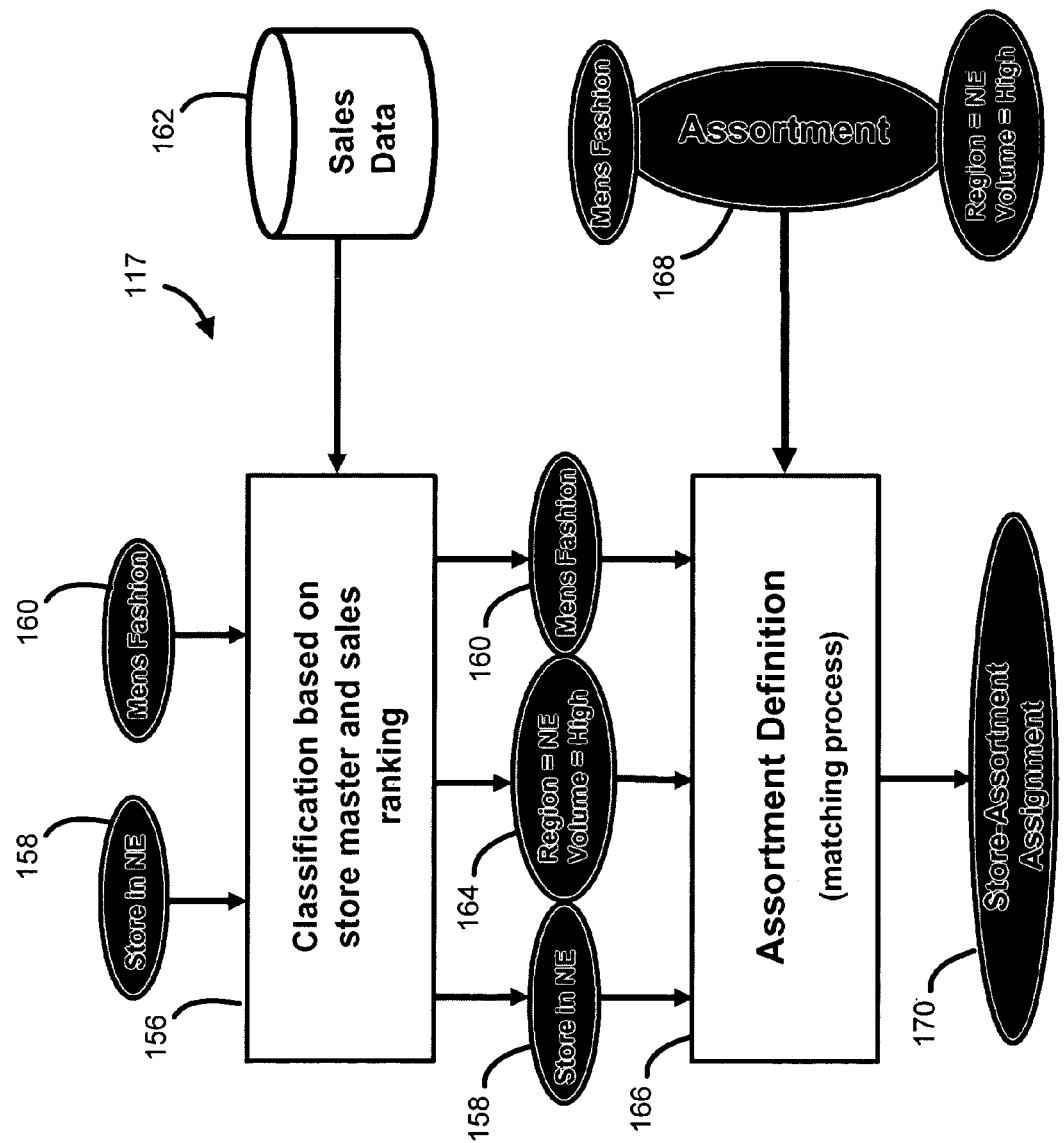
FIG. 10 shows the process of FIG. 9 being used for assortment decision/planning in the context of a specific category.

With reference now to FIG. 10, an example of how assortment definition process 154 may be used to perform store-assortment assignments in a specific context will be provided. In the illustrated embodiment, store input information 158 includes the locations of the stores (e.g., stores in the northeast) and associated category input information 160 (e.g., the consumer theme of "Men's Fashion"). Based on store master and sales ranking information, classification engine 156 identifies the region and sales volume of each store. The particular dimensions (e.g., region and sales volume) used to analyze each store and generate associated dimension information 164 (e.g., that the store is in the region NE and is a high volume store with respect to the category "men's fashion") may be prescribed by a user.

This dimension information 164 is provided to assortment definition engine 166 along with store input information 158 and category input information 160. At the same time, assortment definition engine 166 also receives information regarding any previous and existing store assignments and assortments 168 that are based on similar dimension and category information. Using this data, assortment definition process 154 is able to provide a closed-loop system that allows for improved refinement over subsequent iterations. As explained above, assortment definition engine 166 performs a matching process and outputs a recommended store-assortment assignment 170. The end result of this process is that a particular input store is in the northeast region and is a high sales volume store for men's fashion, and therefore it is assigned to a certain assortment on this basis. Other stores located in different regions and/or having different sales volumes for the men's fashion category would be matched with similar stores and the results used to provide other proposed store-assortment assignments. In addition, this process may be performed for other categories besides men's fashion to create additional store-assortment assignments.

Figure 14A:
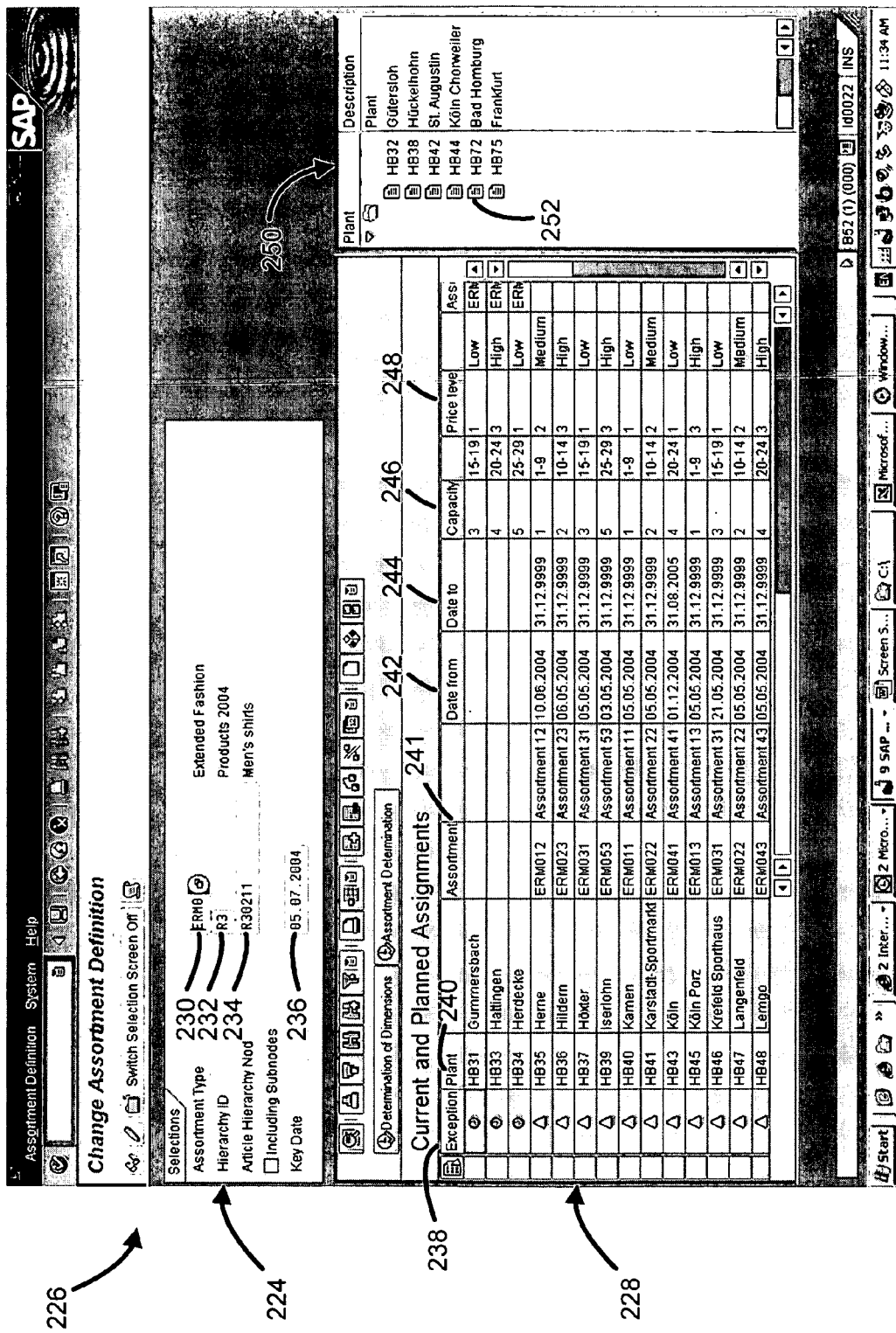
FIGS. 14A, 14B and 14C show graphical user interfaces for an operative assortment planning and control engine associated with the system of FIGS. 12 and 13.
Figure 14B:
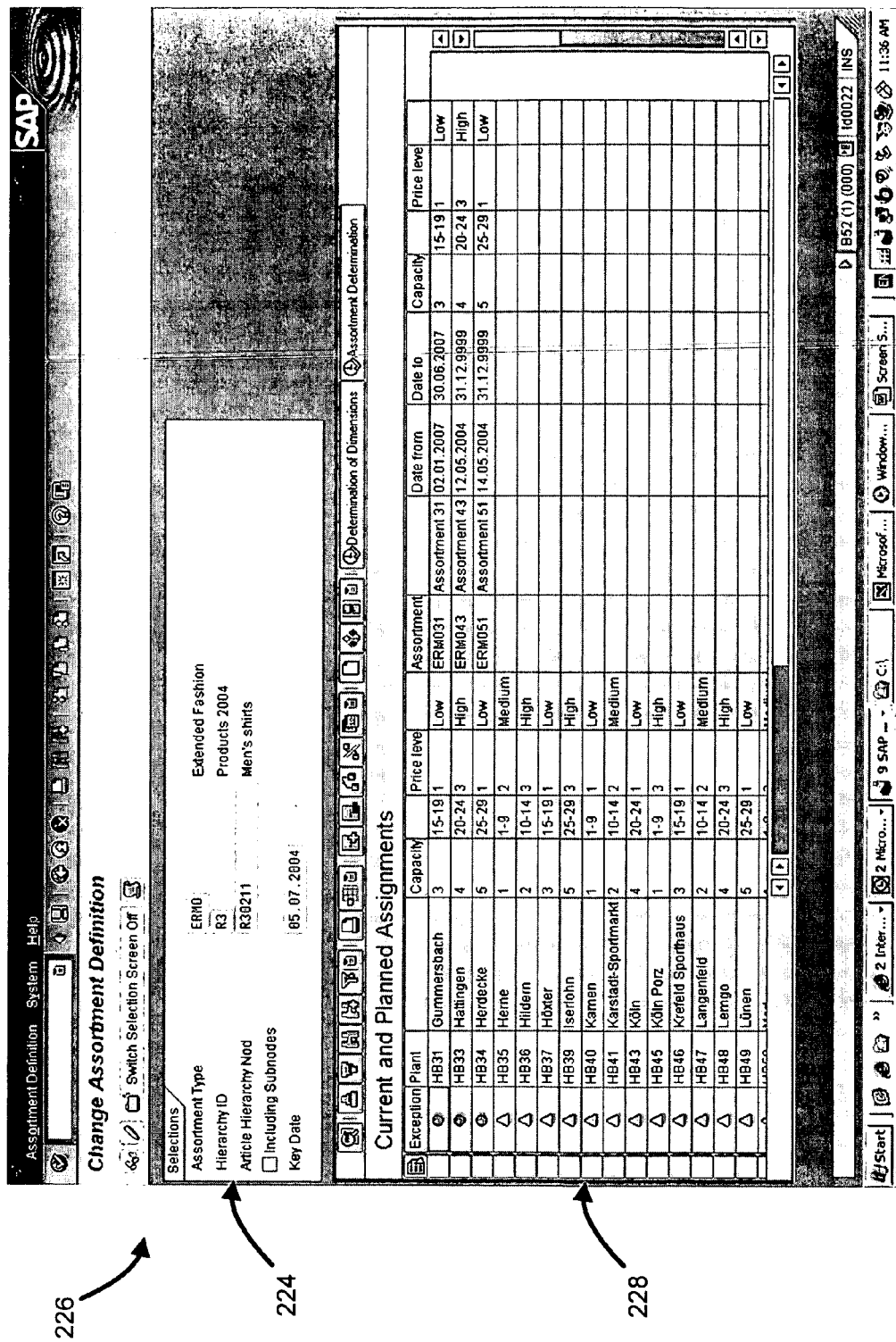
Figure 14C:
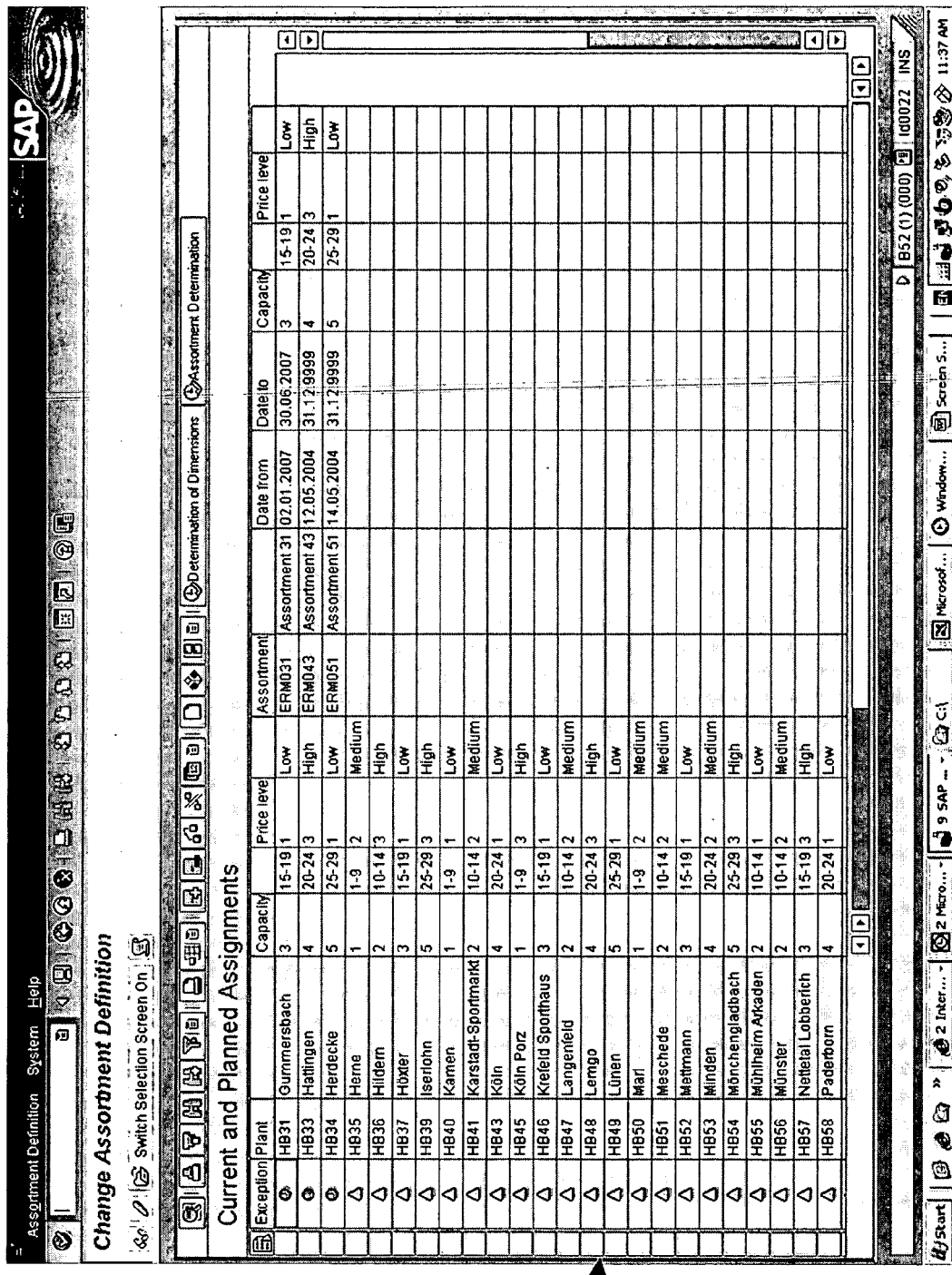

As persons skilled in the art will appreciate, the foregoing assortment decision process creates proposed store-assignment assortments that allow for more efficient assortment planning (i.e., matching the right articles with the rights stores at the right times). According to one embodiment, the proposed store-assortment assignments generated by process 154 may be presented to a user via an assortment definition graphical user interface (GUI) 224 such as shown in FIGS. 14A-14C and described below.

To further illustrate the concepts described above, an example of how assortment definition process 154 may be used to define an assortment of stores for a particular category of articles (e.g., handbags) is provided with reference to FIG. 11. In this example, the assortment creation process is graphically depicted using an assortment planning matrix that includes two dimensions, labeled: "Price Level" (vertical axis) and "Capacity" (horizontal axis). The assortment definition process may be initiated using this matrix by defining an assortment object for every meaningful combination of price level and capacity. For example, "Assortment 35" may be defined and placed in square 172 to represent stores assigned with the classification price level of "3" (e.g., low price) and capacity of "5" (e.g., medium). In addition, Assortment 35 may be assigned to the category "Handbags." In this example, Assortment 35 may correspond to a shelf of a particular display rack of a particular layout module carrying low priced handbags for fashionable customers in medium capacity stores. This shelf is typically replanned regularly, and the temporal evolution is captured by the "assortment version" (or layout module version). Similar planning matrices may be created for each additional category of interest (e.g., suitcases, wallets, backpacks, etc.).

Next, stores may be assigned to the assortments (i.e., store clustering) using assortment definition process 154 described above. This is accomplished by analyzing, for every store, all historical sales data for handbags and classifying a capacity type according to the dimension definition. For example, if a particular input store has the capacity to display 100 handbags at a time, it might be classified as a type "5" store. According to an exemplary embodiment, this analysis may be performed automatically using automated classification engine 156 described above.

In addition to classifying each store by capacity, each store in the embodiment of FIG. 11 is also classified along the "price level" dimension. This may be done, for example, by getting feedback from store managers, cash register receipts, or demographic analysis provided by external companies. This information may be held in a store master database and be updated on a periodic but relatively infrequent basis, such as once per year.

The result of considering all stores using the process discussed above is assignments of stores to assortments, which may be used as inputs to an assortment definition engine (e.g., engine 166 in FIG. 9). According to one possible implementation of the invention, the temporal validity of the store assignments is specified and proposals can be revised and released. The resulting configuration may be checked for consistency by the system without need for human input.

Referring again to the illustrated example, the stores assigned to Assortment 35 represents a group of similar stores for which it is logical to carry a similar set of articles. This set of articles may be determined in a different step and assigned to Assortment 35 to establish the desired article-assortment-store relation.

The assortment decision/planning process and system described above thus create new layout module versions which automatically become valid and later invalid after pre-determined periods of time have elapsed and assigns articles (e.g., handbags) to this version according to the strategic target group (e.g., price level of "3"+capacity level of "5"). For example, an assortment layout module version may be defined to become valid after two months have elapsed and to become invalid after an additional two months have elapsed. After finalizing this plan, the layout module version is released, which means that the ordering process for the relevant articles is started (at least for those articles which are supplied by automatic replenishment).

Figure 12:
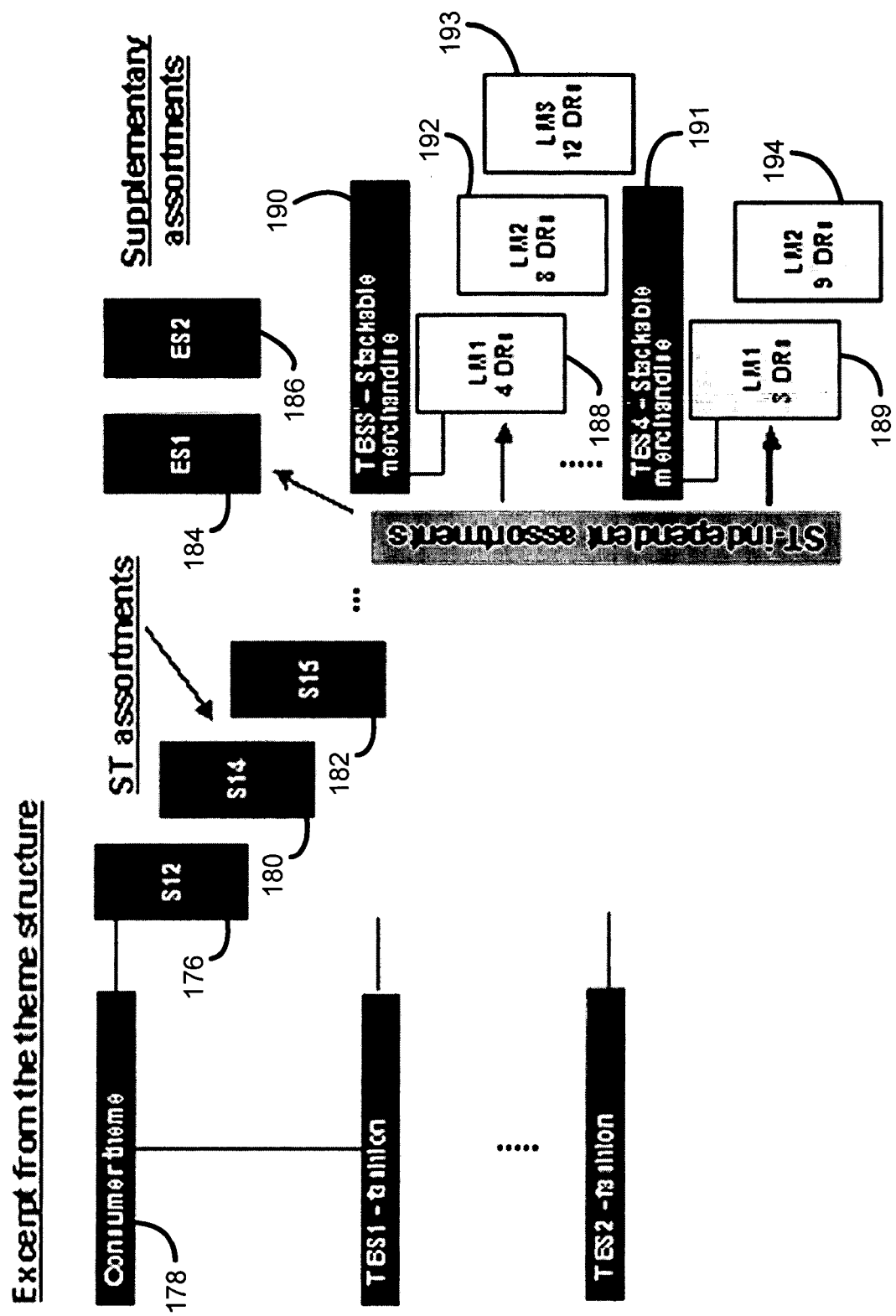
FIGS. 12 and 13 are schematic block diagrams of a system for performing merchandise planning including assortment definition/planning.

As explained above, assortment planning for fashion merchandise and assortment planning for regular (e.g., non-fashion, stackable, basic, etc.) merchandise may be handled differently. For example, whereas the grouping—and thus the standardization—in assortment planning for fashion merchandise may be performed primarily using standard assortments from the business type definitions at the consumer theme level, the grouping for regular merchandise typically takes place at a deeper level in the theme structure, e.g., at or below the theme module. This difference is best illustrated in FIG. 12, which shows an excerpt of a theme structure 174. In theme structure 174, a standard (ST) assortment 176 comprising fashion merchandise is linked to a consumer theme (CT) node 178. Theme structure 174 further includes two additional ST assortments 180 and 182, which may be linked to other CT nodes (not shown) in theme structure 174 or to CT node 178 during consecutive time periods in the future. In addition to ST assortments 176, 180, 182, two supplementary assortments 184 and 186 comprising fashion merchandise are linked to one or more CT nodes (not shown).

As explained above, the assortments for regular merchandise are handled somewhat differently in the exemplary embodiment. In particular, assortments 188 and 189 comprising regular merchandise are linked to theme module (TM) level nodes 190 and 191, respectively. Moreover, two additional standard independent assortments 192 and 193 comprising regular merchandise may be assigned to one or more TM nodes (not shown) presently or to TM node 190 in the future. Similarly, another standard independent assortment 194 for regular merchandise may be assigned to another TM node (not shown) presently or assigned to TM node 191 in the future. As illustrated, each of the standard independent assortments 188, 189, 192, 193 and 194 for regular merchandise may comprise a layout module (LM), which in turn is defined by one or more display racks (DRs) of regular merchandise.

According to an aspect of the invention, a store consumer theme is usually assigned to several assortments. Moreover, each store consumer theme typically has exactly one standard assortment (business type assortment), which is derived from the business type definition as described above. Because the standard assortment contains only fashion articles in this implementation of the invention, business type assortments are not assigned any articles for consumer themes that have only regular merchandise theme modules. Instead, the regular merchandise articles are assigned to the store consumer theme via the assortments in the layout modules.

An illustration of the foregoing implementation of the invention is illustrated in connection with FIG. 13. In this example, a consumer theme 200 identified as "Socks for BT 12" is linked to three assortments 202, 204 and 206. Assortment 202 is a standard assortment for fashion (i.e., a grouping of stores based on business type), which in turn contains links to a number of theme modules. In the illustrated embodiment, standard assortment 202 includes links to a basic theme module 208 along with specialized theme modules for elegance 210, appeal 212, young fashion 214, business fashion 216, casual dress 218, and children's clothing 220. Assortments 204 and 206 are both store assortments 222. In particular, store assortment 204 is a store-specified assortment for a particular brand (e.g., "Fogal") of products, while store assortment 206 is a supplementary assortment for area coverage (i.e., to fill gaps in a particular store or group of stores). The capacity of each assortment/sub-assortment is expressed in terms of a number of display racks (DRs).

According to an aspect of the invention, the grouping of stores by business type is sufficient to provide for a large majority (e.g., 95% or more) of the assortment planning for the stores in each group as a whole. That is, the stores of an enterprise are preferably sufficiently uniform when grouped by business type (i.e., the same consumer theme/capacity/level) that most or all of the necessary assortment planning for these stores can be accomplished at the business type level. Then, the assortment planning necessary to link the remaining small amount of articles (e.g., 5% or less) to the right stores at the right times can be accomplished using supplementary store assortments. For example, the remaining articles can be assigned using supplementary (global) assortments (e.g., for store-specific brand management) based on store capacity or, in some cases, using supplementary (local) assortments (e.g., for flagship stores).

Referring now to FIGS. 14A-14C, a graphical user interface (GUI) 224 is illustrated for displaying, revising and approving store-assignment assortments, such as may generated by assortment definition process 154. In one possible implementation of the invention, GUI 224 may be configured to perform one ore more of the following functions:

(i) Store dimension determination;
(ii) Automatic assortment assignment;
(iii) Add/change/delete new planned assortments;
(iv) Add/change/delete new planned assortment assignments;
(v) Master data display of store and assortment; and
(vi) Filtering/sorting/layout adjusting the list.

In the illustrated implementation of the invention, GUI 224 includes a header area 226, a table area 228, and a store selection area 250. Header area 226 shows selection criteria for the assortments and the associated store assignments which may be revised. Header area 226 includes a plurality of selection criteria fields including an assortment type field 230, an article hierarchy ID field 232, an article hierarchy node (e.g., a category) field 234, and a validity (or key) date field 236. All assignments of stores to assortments that are valid at the date provided in field 234 are shown in table area 228 (discussed in detail below). In most cases, the validity date entered in field 234 is chosen to be in the future because assortment definition process 154 typically defines the store assignment configuration which should be valid for instances of the next year.

Based on selection data entered into header area 290, all of the actual (i.e., current) and planned assignments of stores to assortments are presented in table area 228. In the illustrated implementation of the invention, table area 228 includes an exception column 238, a plant (or store) column 240, an assortment column 241, a date from column 242, a date to column 244, a capacity type column 246, and a price level type column 248.

Exception column 238 shows the status of each assignment of a store to an assortment. Green indicates an assignment that has already been released to an operative execution system, i.e., the store-assortment assignment is actually in use. Yellow indicates an assignment that has been planned but not yet released. Red indicates an assignment that is incomplete. Assignments that are planned are not visible "outside" the planning system. After a planned assortment is approved and released to operative systems, it receives the status released and the yellow light in column 238 is replaced by a green light. From a planning standpoint, it may be important to know whether the assignments are already used operatively because, if so, changes should be limited. In the illustrated implementation of the invention, operative (e.g., "actual") assignments are shown in the left side columns of table area. If an operative assortment is being replaced by a new (planned) assignment, the new (planned) assignment is shown in the same row in the far right hand columns (see FIGS. 14B and 14C).

Continuing with the description of table area 228, store column 240 shows the stores, including the technical name (e.g., unique ID) and the associated description. Assortment column 241 shows the actual/planned/incomplete assortment, including the technical name (e.g., unique ID) and the associated description. Date from column 242 and date to column 244 show the validity period for the assignment. Capacity column 246 shows the capacity type of the store, and price level column 248 shows the price level type of the store.

In the illustrated implementation of the invention, GUI 224 may includes a plurality of buttons which may be selected (e.g., by clicking with a mouse) to invoke various functions associated with assortment definition. For example, GUI 224 may include a "Find Assortments" button that may be selected to launch the store matching process and (potentially) propose a new assortment for each store. If this proposal is found acceptable to the user and accepted, a new (planned) assortment is created and the old assignment is terminated.

Store selection area 250 shows all of the stores that match the selection criteria entered into fields 230-236 in header area 224 but have not yet been assigned to an assortment. In one possible implementation of the invention, store selection area 250 includes a tree structure 252 that includes all of the eligible stores. In this implementation, the stores may be dragged from tree 252 and dropped onto an assortment in table area 228 to create a new assignment manually.

Figure 15:
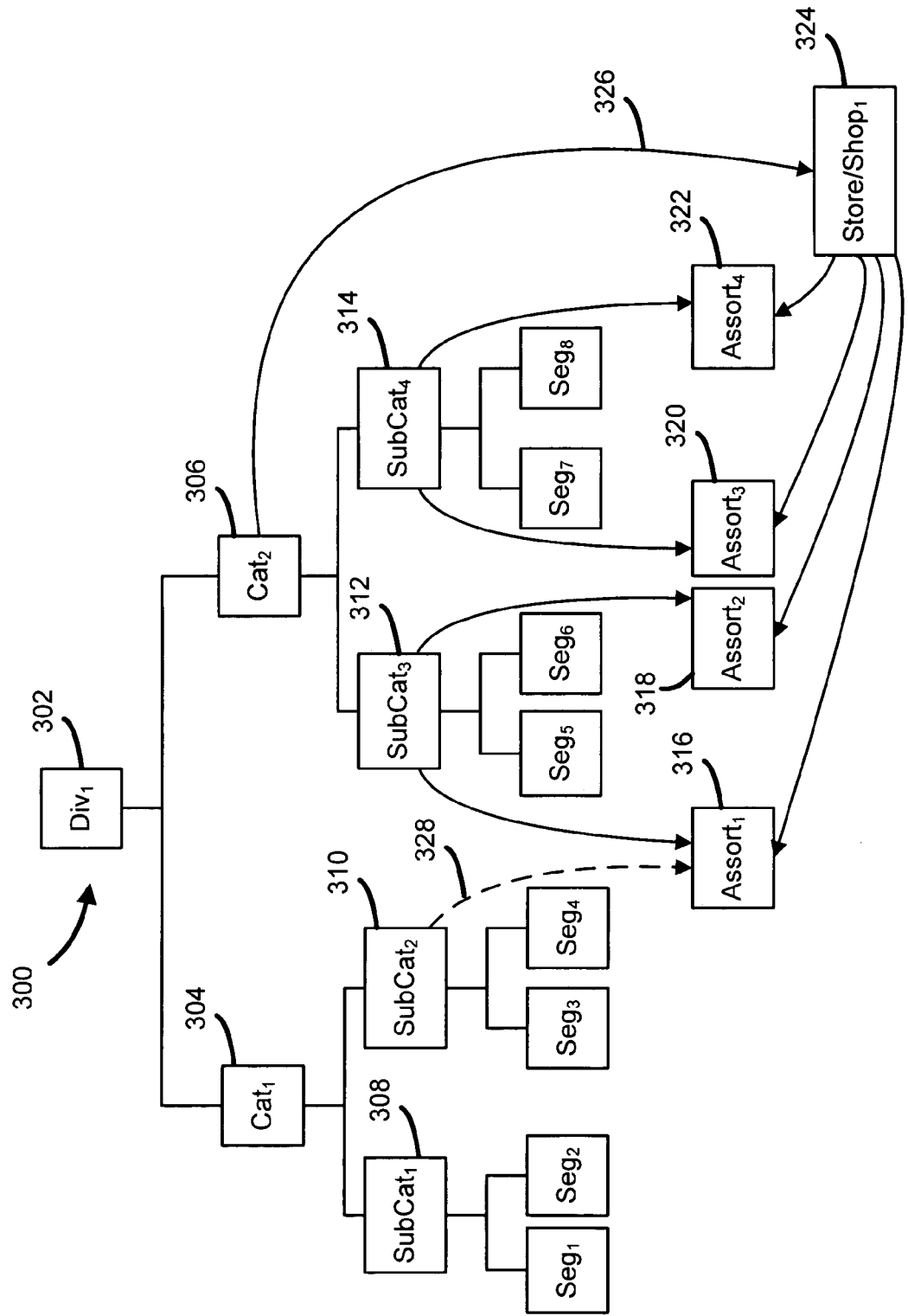
FIG. 15 shows an exemplary view of an article hierarchy having various nodes therein assigned to assortments and another node in the hierarchy assigned to a store as a check on the products that are assignable to the assortment and thus the store.

With reference now to FIG. 15, one possible implementation of an assortment definition/planning system for restricting the assignment of certain types of products to particular stores is shown and described. In FIG. 15, an article hierarchy 300 is illustrated with a structure such as described above with reference to article hierarchy 18 in FIG. 1. In particular, an uppermost division level node 302 is shown linked to a pair of category level nodes 304 and 306, each of which is shown linked to a pair of subcategory nodes 308, 310, 312, 314. More specifically, category node 304 is shown linked to subcategory nodes 308 and 310, while category node 306 is shown linked to subcategory nodes 312 and 314. In turn, each subcategory node 308, 310, 312 and 314 is shown linked to a number of segment nodes. It will be understood that each segment node may be linked to one or more generic articles or article variants (not shown in FIG. 15). It will also be understood that the particular structure of hierarchy 300 shown in FIG. 15 is merely exemplary and that more or fewer levels could be used, as well as different names for the various levels.

As described above, one or more nodes in hierarchy 300 may be assigned (or linked) to an assortment for purposes of assigning a group of products to that assortment (and thus the stores in that assortment) during assortment planning. For example, subcategory node 312 may be assigned to a pair of assortments 316 and 318 to provide a group assignment of the products under node 312 to assortments 316 and 318. It may be desirable to assign a single node to two assortments, for example, when assortment 316 is for small stores and assortment 318 is for large stores. As another example, subcategory node 314 may be assigned to a pair of assortments 320 (for small stores) and 322 (for large stores) to assign the products under node 314 to assortments 320 and 322. After each of the foregoing assignments of a subcategory node to an assortment is made, one or more products beneath the subcategory node may be excluded (e.g., using a suitable GUI) from the assortment as explained above. Although not illustrated in FIG. 15, nodes above or below the subcategory level could also (or alternatively) be assigned to the assortments.

In addition to the assignments of products to assortments, it is also necessary to assign stores to the assortments so that the desired products are provided to the correct stores at the proper times. Typically, the assignment of the stores to the assortments is performed prior to assigning the products to the assortments using an assortment definition process such as described above in detail. In FIG. 15, a store (or shop) 324 is shown as having already been assigned to assortments 316, 318, 320 and 322.

In one possible implementation of the invention, an additional link can be established to create a check or restriction on the types of products that are assignable to a particular store during assortment planning. More specifically, a particular node at one level (e.g., a category level) in an article hierarchy may be assigned to a store to indicate that only products below that node are assignable to that store. In FIG. 15, for example, a link 326 can be established between category node 306 and store node 324 to restrict the types of products that are assignable to store 324 to only those products below node 306. Thus, while the assignment of subcategory 312 to assortment 316 is permissible, the assignment of subcategory 310 to assortment 316 is not permissible (as indicated by a dashed line 328). The assortment planning system may be configured so that any impermissible assignments are completely prevented by the system. Alternatively, the impermissible assignments may simply flagged to users as possible errors in the system but allowed to exist. As yet another possibility, impermissible assignments may be overridden manually, but only when appropriate supervisory approval is given (e.g., by entry of certain passwords).

As persons skilled in the art will recognize, a restriction or check such as described above with reference to FIG. 15 may be particularly beneficial in the context of department stores. For example, if category nodes 304 and 306 represent women's fashion and men's fashion, respectively, and store 324 represents a men's wear shop in a department store, then it may be desirable to establish a link between category node 306 and store 324. When this assignment is made, any attempt to assign women's fashion products to store 324 during assortment planning would be flagged as impermissible.

It is important to note that the above-described preferred and alternative implementations for performing assortment planning are illustrative only. Although assortment planning has been described with respect to different implementations thereof, those skilled in the art will appreciate that numerous modifications are possible without materially departing from the novel teachings and advantages of the subject matter described herein. For example, although the stores discussed above are illustrated and described as being linked directly to the assortments, the linkage could be via assortment versions as with the products. Similarly, the assortment versions used for linking the products to the assortments could be eliminated and instead the products linked directly to the assortments. As another example, the products/articles described could be pre-packed products/articles that comprise a standard collection of sizes and/or colors or other variants of each product. Accordingly, these and all other such modifications are intended to be included within the scope of the present invention.

Given the assortment planning information as described above, the assortment planning information is utilized as an input to a product layout application program or shelf optimization program (SOP), in order to determine an optimal product layout for a particular store for a particular time period (e.g., for a particular month of the year, or for a particular season).

Each fixture in a layout module version is preferably provided with a capacity, whereby capacity planning is described in detail in U.S. patent application Ser. No. 10/902,498, filed Jul. 29, 2004, entitled "Capacity Planning for Stores", which is incorporated in its entirety herein by reference. With products assigned to each of the fixtures in each layout module version, and with each layout module version being given a time validity, the products constituting a layout module version can be input to a shelf optimization program (SOP), in order to determine an appropriate display of those products on a shelf or in an entire store.

As discussed earlier herein, multiple fixtures may be assigned to an assortment version. For example, FIG. 16 shows Fixture 1, Fixture 2, and Fixture 3 assigned to Layout Module Version 1, whereby Product 1 and Product 2 are assigned to Layout Module Version 2. A fixture represents any appliance that is used to physically display products in a store. It can be an individual shelf, a complete display rack with multiple shelves, or even multiple display racks.

When products are assigned to a layout module version, the user provides an indication (e.g., via an entry made by a user from a GUI screen) as to which fixture the product should be placed. Note that a fixture itself does not have a validity period, but once a fixture is assigned to a layout module version, the assignment becomes automatically valid for the total validity period of the layout module version (e.g., for the 2006 summer/fall season).

Self-optimization tools currently exist for optimizing how and where products can be positioned on a shelf or shelves. The present invention provides an interface to such a self-optimization tool, where a layout module version (with products and fixture assignments) is sent to an optimization tool and the result is imported back into the system.

In a preferred implementation, a capacity can be defined for each fixture assigned to an assortment version, whereby the capacity of the same fixture can be different depending upon the assortment version. When products are assigned to a layout module version, there is preferably provided an indication as to which fixture the product or products should be placed. A capacity check can optionally be performed, whereby the capacity check checks if too many products are assigned to one fixture. A capacity check can also be performed per store, whereby the store capacity is checked against the total capacity of the layout module versions that are assigned to a store.

In one embodiment of the invention, the product information obtained from a layout module version is input to a product layout application program of a shelf optimization program. Product layout applications are well known in the art, and include, for example, Dynascan™ Impact Merchandising application, Evolve™ Merchant 4.1 product layout application, and Marks & Spencer™ Automated Space and Assortment Planning Tool.

Since the assortment planning is done with respect to different types of merchandise (e.g., fashion merchandise, stackable merchandise) and is done with respect to different sales periods (e.g., summer sales period, winter sales period, etc.), one can readily perform product layout planning for particular groups of merchandise and for particular time periods, utilizing well known product layout application programs together with capacity planning information and assortment planning information that is computed in accordance with the present invention.

Figure 17:
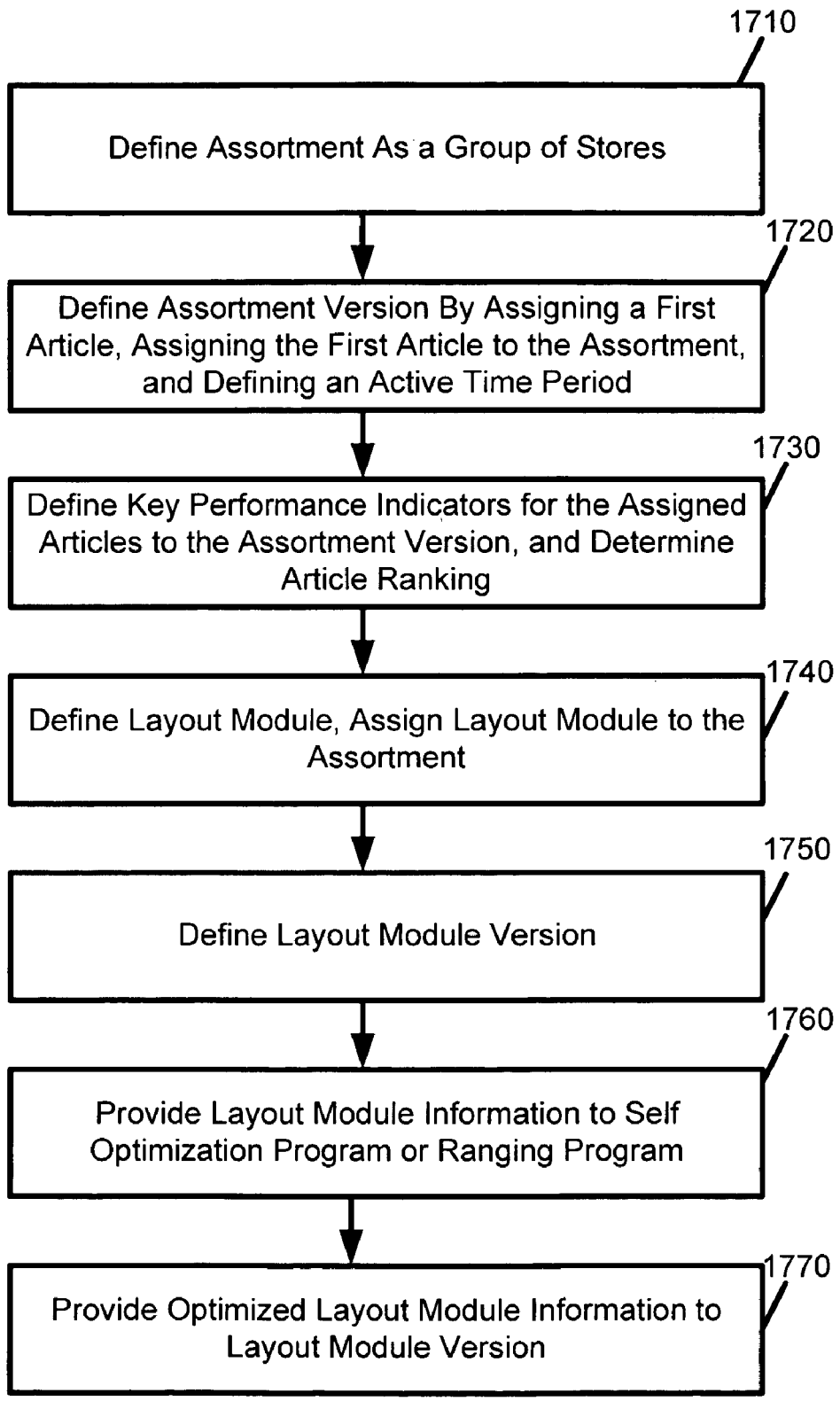
FIG. 17 is a block diagram of a product layout method, according to a first embodiment of the invention.

FIG. 17 shows a product layout method according to a preferred embodiment of the invention. In a first step 1710, there is defined an assortment as a group of stores. In a second step 1720, there is defined an assortment version by assigning a first article, assigning the first article to the assortment, and defining a time period during which the first article assignment is active, thereby determining the time period during which the first article is in the assortment. In a third step 1730, there is defined planning key performance indicators (KPIs) for the articles assigned to the assortment version, and determining an article ranking based on the KPIs. In a fourth step 1740, there is defined a layout module, and the layout module is assigned to the assortment, whereby the layout module includes at least one fixture assigned to it and whereby the layout module represents a display area of the store. In a fifth step 1750, there is defined a layout module version that represents a product layout for the group of stores for a time period based on the corresponding assortment version. In a sixth step 1760, the layout module information is provided to a shelf optimization or ranging program. In a seventh step 1770, the optimized layout module information is received and the information is inputted to the layout module version.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A machine-readable storage medium storing a program product for determining a product layout for a group of stores, the program product comprising machine-readable program code for causing, when executed, one or more machines to perform the following:

receiving sales information for a plurality of stores, the sales information of the plurality of stores comprising a theme module defining a group of related products and article information defining a specific product of the group of related products, wherein the article information comprises a template display rack capacity and an individual display rack capacity;

calculating a capacity index based on the individual display rack capacity and the template display rack capacity, wherein the capacity index comprises a ratio of the individual display rack capacity and the template display rack capacity;

determining a capacity type value based on the capacity index;

assigning the calculated capacity type value to each of the plurality of stores;

defining a criteria level for each of the plurality of stores based on the demographics and price level of the each of the plurality of stores;

categorizing the plurality of stores according to both the capacity type value and the criteria level;

assigning one or more stores to an assortment based on the categorizing result;

defining a first assortment version upon assignment of a first product to the assortment for a first time period, the first assortment version having a validity period corresponding to the first time period;

defining a layout module and assigning the layout module to the assortment, the layout module representing a display area of the plurality of stores;

defining a first layout module version upon the assignment of the layout module to the assortment, the first layout module version representing a product layout of the first assortment version and having a validity period corresponding to the validity period of the first assortment version;

receiving, from a user, a selection of at least one fixture on which the first product is to be positioned;

providing information of the first layout module version to a shelf optimization or ranging program;

receiving optimized first layout module information from the shelf optimization or ranging program and inputting the optimized first layout module information to the first layout module version;

defining a second assortment version upon assignment of a second product to the assortment for a second time period nonoverlapping with the first time period, the second assortment version having a validity period corresponding to the second time period; and defining a second layout module version upon the assignment of the layout module to the assortment, the second layout module version representing a product layout of the second assortment version and having a validity period corresponding to the validity period of the second assortment version;

wherein receiving the optimized first layout module information from the shelf optimization or ranging program comprises receiving information regarding a position for the first product at the at least one fixture.

2. The machine-readable storage medium of claim 1, wherein the layout module is assigned to the assortment on a one-to-one relationship.

3. The machine-readable storage medium of claim 1, wherein the assortment versions define the corresponding layout module versions.

4. The machine-readable storage medium of claim 1, wherein the machine-readable program code is further for causing, when executed, the one or more machines to perform:
 providing the layout module version including assigned products with planning key performance indicators and fixtures to a shelf optimization program.

5. The machine-readable storage medium of claim 4, wherein the machine-readable program code is further for causing, when executed, the one or more machines to perform:
 defining sales volume, gross margin, inventory turnover and gross margin return on investment (GMROI) for the products that are assigned to the layout module version, and
 determining a product ranking based on a sales and GMROI index and providing the layout module version including assigned product ranking and fixtures to a shelf optimization.

6. The machine-readable storage medium of claim 1, wherein the machine-readable program code is further for causing, when executed, the one or more machines to perform:
 receiving the optimized layout module version information.

7. The machine-readable storage medium of claim 1, wherein the machine-readable program code is further for causing, when executed, the one or more machines to perform:
 defining planning key performance indicators (KPIs) for the products assigned to the assortment version; and
 determining a product ranking based on the KPIs.

8. The machine-readable storage medium of claim 1, wherein the machine-readable code is further for causing, when executed, the one or more machines to perform:
 providing information of the second layout module version to the shelf optimization or ranging program; and
 receiving the optimized layout module information and inputting the optimized layout module information to the second layout module version.

9. The machine-readable storage medium of claim 1, wherein defining the first assortment version upon assignment of the first product to the assortment for the first time period is performed independent of spatial characteristics of the layout module.

10. A system for determining a product layout for a store, comprising:
 means for receiving sales information for a plurality of stores, the sales information of the plurality of stores comprising a theme module defining a group of related products and article information defining a specific product of the group of related products, wherein the article information comprises a template display rack capacity and an individual display rack capacity;
 means for calculating a capacity index based on the individual display rack capacity and the template display rack capacity, wherein the capacity index comprises a ratio of the individual display rack capacity and the template display rack capacity;
 means for determining a capacity type value based on the capacity index;
 means for assigning the calculated capacity type value to each of the plurality of stores;
 means for defining a criteria level for each of the plurality of stores based on the demographics and price level of the each of the plurality of stores;
 means for categorizing the plurality of stores according to both the capacity type value and the criteria level;
 means for assigning one or more stores to an assortment based on the categorizing result;
 means for defining a first assortment version upon assignment of a first product to the assortment for a first time period, the first assortment version having a validity period corresponding to the first time period;
 means for defining a layout module and assigning the layout module to the assortment, the layout module representing a display area of the plurality of stores;
 means for defining a first layout module version upon the assignment of the layout module to the assortment, the first layout module version representing a product layout of the first assortment version and having a validity period corresponding to the validity period of the first assortment version;
 means for receiving, from a user, a selection of at least one fixture on which the first product is to be positioned;
 means for providing information of the first layout module version to a shelf optimization or ranging program; and
 means for receiving optimized first layout module information from the shelf optimization or ranging program and inputting the optimized first layout module information to the first layout module version;
 wherein the means for defining the first assortment version is further for defining a second assortment version upon assignment of a second product to the assortment for a second time period nonoverlapping with the first time period, the second assortment version having a validity period corresponding to the second time period;
 wherein the means for defining the first layout module version is further for defining a second layout module version upon the assignment of the layout module to the assortment, the second layout module version representing a product layout of the second assortment version and having a validity period corresponding to the validity period of the second assortment version; and
 wherein the means for receiving the optimized first layout module information from the shelf optimization or ranging program is further for receiving information regarding a position for the first product at the at least one fixture.

11. The system of claim 10, wherein the layout module is assigned to the assortment on a one-to-one relationship.

12. The system of claim 10, wherein the assortment versions define the corresponding layout module versions.

13. The system of claim 10, further comprising:
 means for defining planning figures, sales volume, gross margin, inventory turnover and gross margin return on investment (GMROI) for the products that are assigned to the layout module version, and determining a product ranking based on a sales and GMROI index.

14. The system of claim 10, further comprising:
 means for providing the layout module version including assigned products with planning key performance indicators and fixtures to a shelf optimization program.

15. The system of claim 10, further comprising:
 means for receiving the optimized layout module version information.

16. The system of claim 10, further comprising:
 means for defining planning key performance indicators (KPIs) for the products assigned to the assortment version; and means for determining a product ranking based on the KPIs.

17. The system of claim 10,
wherein the means for providing information of the first layout module version is further for providing information of the second layout module version to the shelf optimization or ranging program; and
wherein the means for receiving the optimized first layout module information is further for receiving the optimized second layout module information and inputting the optimized second layout module information to the second layout module version.

18. The system of claim 10, wherein the means for defining the first assortment version upon assignment of the first product to the assortment for the first time period operates independent of spatial characteristics of the layout module.

* * * * *